United States Patent [19]
Makino et al.

[11] Patent Number: 6,123,403
[45] Date of Patent: Sep. 26, 2000

[54] IMAGE COMMUNICATING APPARATUS CONTROLLING DATA RECEPTION BASED ON NUMBER OF NON-DISCHARGE CONDITION

[75] Inventors: Tsunehiro Makino; Akihiro Ryuka, both of Tokyo; Yasuhito Shimamura; Hideaki Chishima, both of Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/092,937

[22] Filed: Jul. 19, 1993

Related U.S. Application Data

[63] Continuation of application No. 07/656,679, Feb. 19, 1991, abandoned.

[30] Foreign Application Priority Data

| Feb. 23, 1990 | [JP] | Japan | 2-41055 |
| Mar. 8, 1990 | [JP] | Japan | 2-59689 |

[51] Int. Cl.$^7$ ................................ B41J 29/38
[52] U.S. Cl. ............................ 347/5; 347/23; 347/3
[58] Field of Search ................... 347/3, 23, 19, 347/7, 14, 85; 358/296

[56] References Cited

U.S. PATENT DOCUMENTS

| 4,067,019 | 1/1978 | Fleischer et al. | 347/81 |
| 4,123,761 | 10/1978 | Kimura et al. | 347/30 |
| 4,313,124 | 1/1982 | Hara | 347/57 |
| 4,323,905 | 4/1982 | Reitberger et al. | 347/19 X |
| 4,328,504 | 5/1982 | Weber et al. | 347/19 X |
| 4,333,088 | 6/1982 | Diggins | 347/35 |
| 4,345,262 | 8/1982 | Shirato et al. | 347/10 |
| 4,376,283 | 3/1983 | Bower | 347/3 |
| 4,459,600 | 7/1984 | Sato et al. | 347/47 |
| 4,463,359 | 7/1984 | Ayata et al. | 347/56 |
| 4,484,199 | 11/1984 | Watanabe | 347/19 |
| 4,558,333 | 12/1985 | Sugitani et al. | 347/65 |
| 4,587,535 | 5/1986 | Watanabe | 347/23 |
| 4,636,814 | 1/1987 | Terasawa | 347/7 X |
| 4,661,822 | 4/1987 | Hirota et al. | 347/6 |
| 4,723,129 | 2/1988 | Endo et al. | 347/56 |
| 4,734,718 | 3/1988 | Iwagami et al. | 347/28 |
| 4,740,796 | 4/1988 | Endo et al. | 347/56 |
| 4,947,191 | 8/1990 | Nozawa et al. | 347/30 |
| 4,970,599 | 11/1990 | Nobuta | 358/296 |
| 4,972,270 | 11/1990 | Kurtin et al. | 358/296 |
| 4,999,643 | 3/1991 | Terasawa | 347/30 |
| 5,140,429 | 8/1992 | Ebinuma et al. | 358/296 |
| 5,249,068 | 9/1993 | Takase | 358/461 |
| 5,251,049 | 10/1993 | Saito | 358/296 |

FOREIGN PATENT DOCUMENTS

| 0039772 | 11/1981 | European Pat. Off. . |
| 54-65536 | 5/1979 | Japan . |
| 56-24868 | 3/1981 | Japan . |
| 0048107 | 7/1981 | Japan . |
| 58-69084 | 4/1983 | Japan .............. B41J 27/00 |
| 59-123670 | 7/1984 | Japan . |
| 59-138461 | 8/1984 | Japan . |
| 60-224549 | 11/1985 | Japan . |
| 60-224552 | 11/1985 | Japan . |
| 60-253552 | 12/1985 | Japan ...................... 347/35 |
| 61-98040 | 6/1986 | Japan . |
| 63-31934 | 3/1988 | Japan . |
| 1-130948 | 5/1989 | Japan ...................... 347/19 |
| 1-297253 | 11/1989 | Japan . |
| 3-2040 | 1/1991 | Japan ................. B41J 2/01 |
| WO89002827 | 4/1989 | WIPO . |

*Primary Examiner*—David F. Yockey
*Assistant Examiner*—Anh T. N. Vo
*Attorney, Agent, or Firm*—Fitzpatrick, Cella, Harper & Scinto

[57] ABSTRACT

A facsimile apparatus is equipped with an ink jet printer in which the recording head is inspected for ink discharge failure in response to a call signal, then a head recovery process is effected in case of discharge failure, and the normal data reception process is started after the discharge failure is rectified. If the discharge failure is not rectified after repeated recovery processes, the communication is interrupted, so that wasted communication resulting from malfunction of the recording head can be avoided.

10 Claims, 20 Drawing Sheets

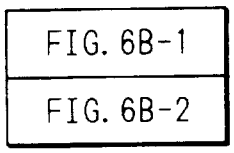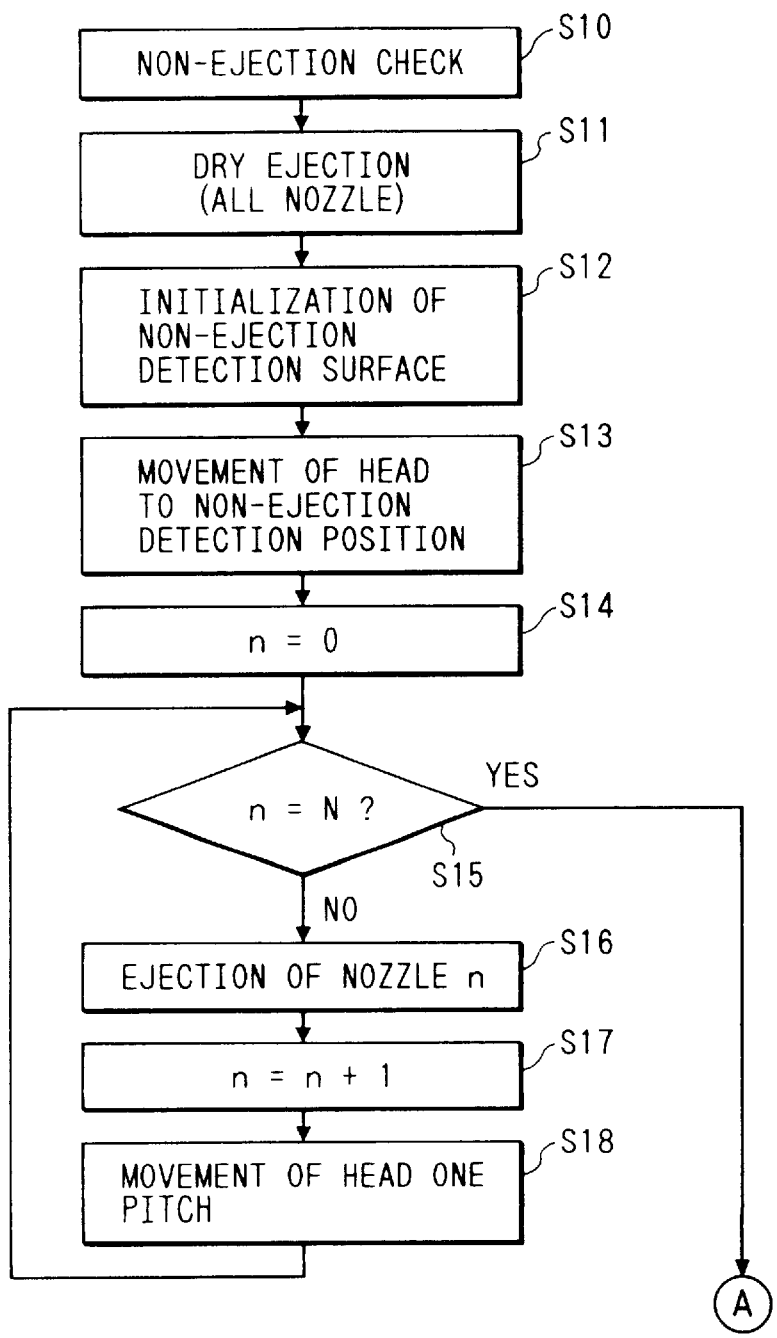

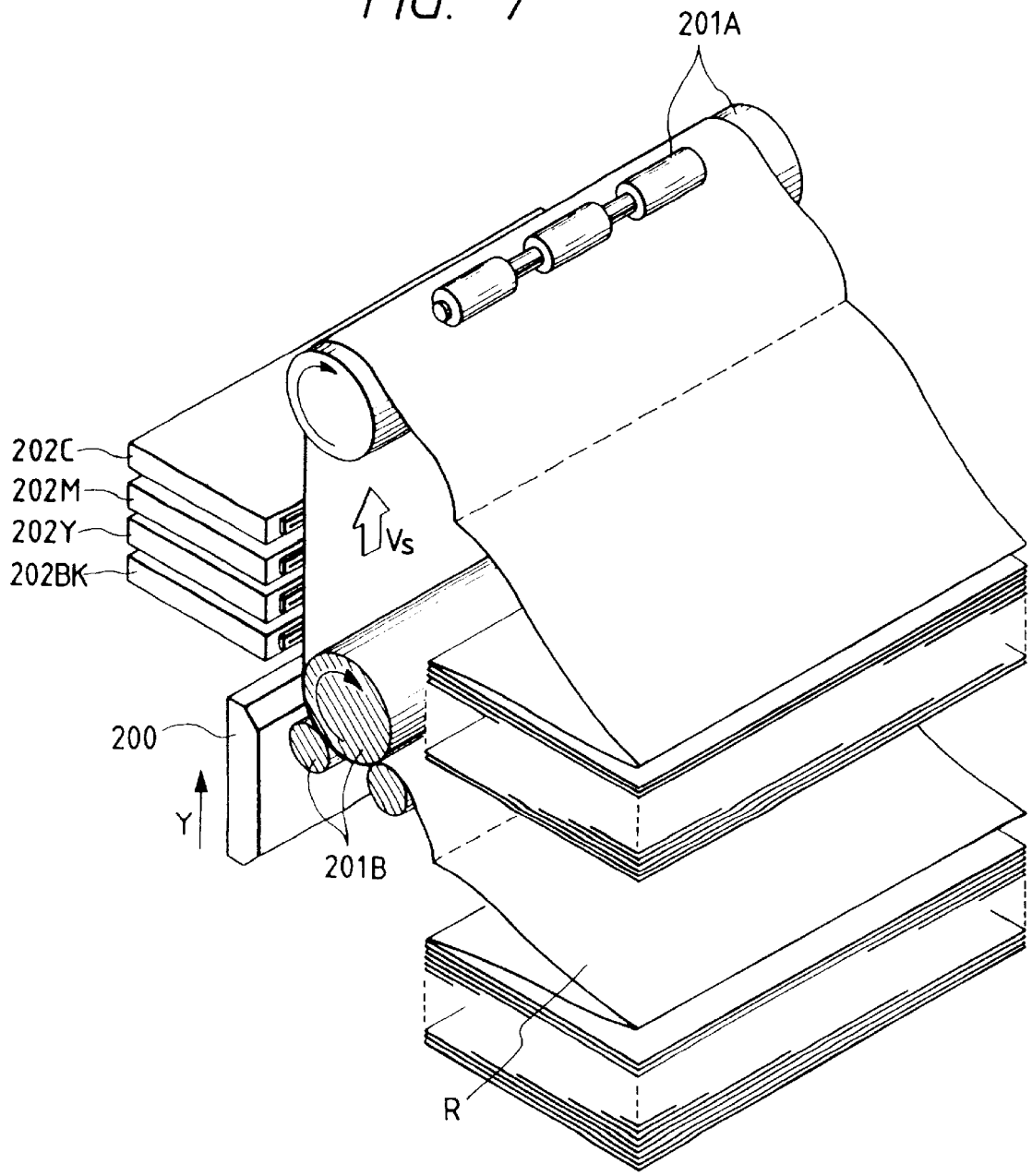

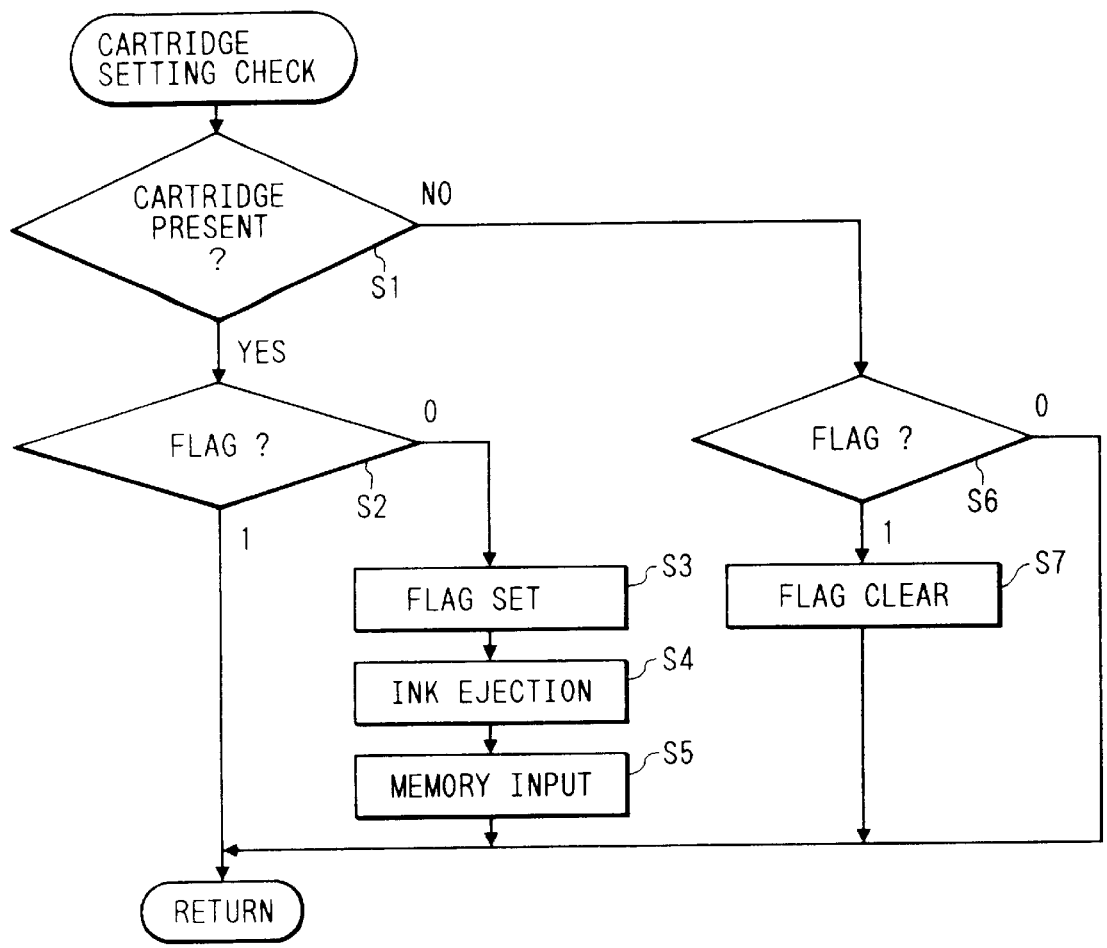

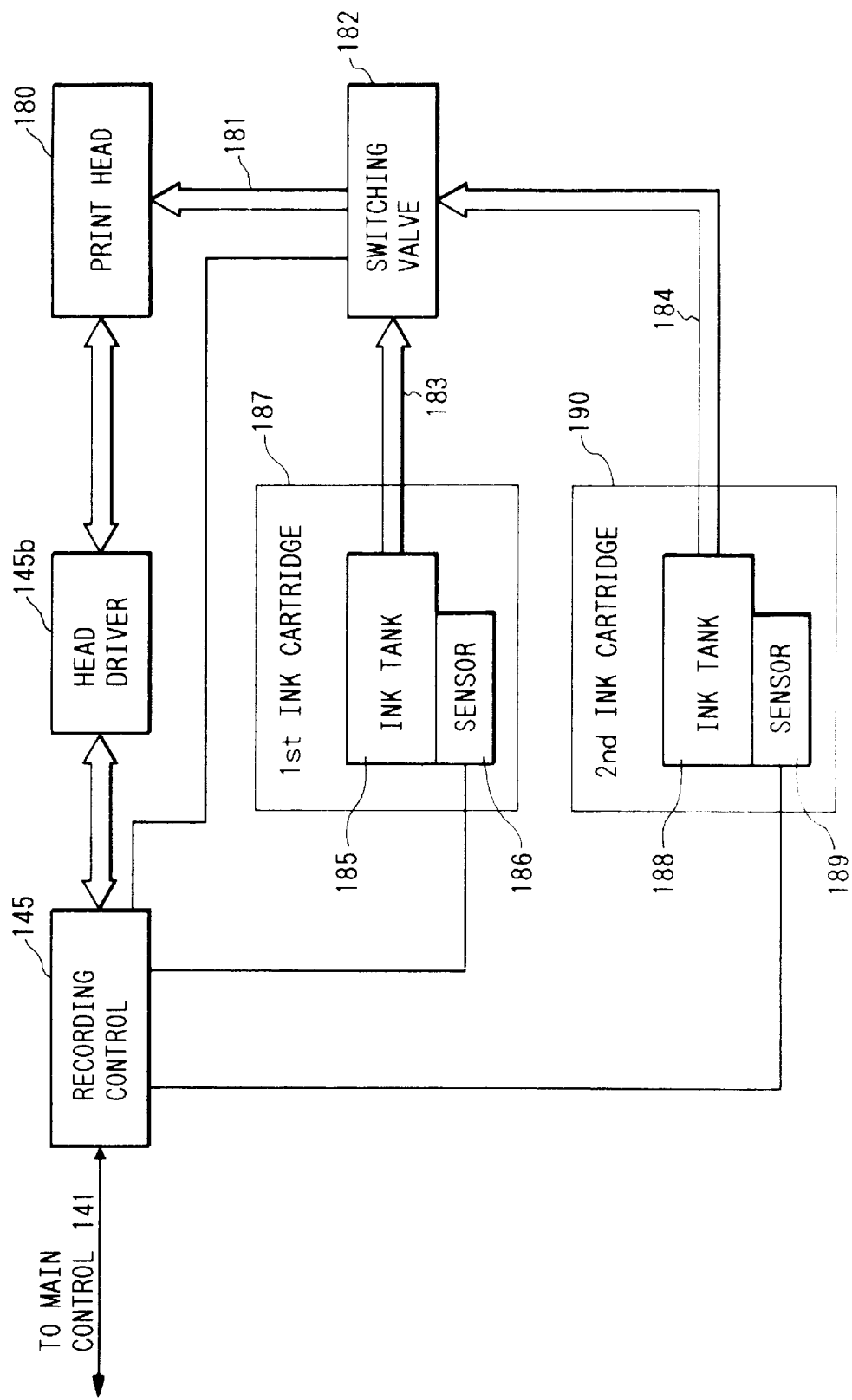

IMAGE COMMUNICATING APPARATUS CONTROLLING DATA RECEPTION BASED ON NUMBER OF NON-DISCHARGE CONDITION

This application is a continuation of application Ser. No. 07/656,679 filed Feb. 19, 1991, now abandoned.

BACKGROUND OF THE INVENTION

1. Field of the Invention

The present invention relates to an image communicating apparatus such as a facsimile apparatus, and more particularly an image communicating apparatus equipped with an ink jet printer provided with plural ink discharge openings.

2. Related Background Art

There has recently been developed an ink jet printer for recording characters or an image by discharging ink from discharge openings or orifices on to a recording material, utilizing bubbles generated by thermal energy. Because the heat generating member (heater) provided in each discharge opening is significantly smaller than the piezoelectric element employed in the conventional ink jet printers, this ink jet printer enables a high-density arrangement of multiple discharge openings, thereby providing a recorded image of high quality. In addition it has additional advantages such as high speed and low noise.

On the other hand, the facsimile apparatus are required not only to transmit the image at a high speed, but also to receive an image with a high image quality and a high speed. In consideration of the above-mentioned features, the ink jet printer of the method discharging the ink toward the recording material utilizing the bubbles generated by thermal energy is considered as one of the printers capable of meeting such requirements.

In such ink jet printer, the ink discharge openings of the recording head may be clogged by the ink which is viscosified by a pause in the use of the recording head, or in a low humidity situation or by a difference in the frequency of use, or by the deposition of dust. For this reason there has been employed a discharge recovery mechanism for removing such viscosified ink by pressurizing the discharge openings from the interior of the recording head, or by sucking said ink from a protective cap for covering the discharge openings of the recording head. Also when the recording head is not in use, the discharge openings thereof are covered with a cap to prevent the failure in ink discharge.

However, despite such countermeasures, the ink discharge openings may still become clogged in case of a prolonged pause in the use of the recording head or under a relatively dry ambient condition, because the ink path communicating with each ink discharge opening is extremely narrow. Also ink discharge openings used very infrequently in a recording operation may be clogged in a next recording operation. Such clogging results in white streaks or stripes on the recorded image, thus deteriorating the quality thereof and causing lack of information to be recorded. Consequently, the operator has conventionally checked the discharge failure by visual observation of the state of the recorded image, and has manually instructed the above-explained recovery operations in case discharge failure is identified in some discharge openings.

However, in realizing a facsimile apparatus equipped with such an ink jet printer, such manual inspection of or instruction for the discharge failure is extremely inconvenient for a facsimile apparatus because a received image signal has to be wasted, and there will result a drawback that the resending of the image signal has to be requested manually, for example by a photocall after the signal reception is completed. Also the necessity for such inspection for discharge failures may be forgotten or a request for signal resending may not be possible due to the office hours of the sender.

SUMMARY OF THE INVENTION

In consideration of the foregoing, an object of the present invention is to provide an improved image communicating apparatus.

Another object of the present invention is to provide an image communicating apparatus capable of recording image data without omission.

Still another object of the present invention is to provide an image communicating apparatus capable of automatically recovering the state of the recording head prior to the start of printing the received image data and securely ensuring satisfactory ink discharge.

Still another object of the present invention is to provide an image communicating apparatus capable detecting absence of ink discharge in the course of recording operation, and controlling the recording and/or receiving operation according to the result of detection.

Still another object of the present invention is to provide an image communicating apparatus capable of checking the recording head for ink discharge failure in response to signal reception, and entering the reception process after the detection of a normal discharge state.

Still another object of the present invention is to provide an image communicating apparatus capable of checking the recording head for ink discharge failure in response to signal reception, and effecting a recovery process upon detection of a discharge failure state.

Still another object of the present invention is to provide an image communicating apparatus capable of providing an alarm in case discharge failure is detected even after a recovery process succeeding to the detection of discharge failure.

Still another object of the present invention is to provide a device for detecting discharge failure by detecting the ink dots discharged on a detection plane in the unit of each dot, and an image communicating apparatus equipped with such detecting device.

Still another object of the present invention is to provide an image communicating apparatus capable of preventing omission of image data resulting from lack of ink.

Still another object of the present invention is to provide an image communicating apparatus capable, in case ink is exhausted in the course of recording of received image data, of replenishing the ink after the end of communication.

Still another object of the present invention is to provide an image communicating apparatus capable, in case ink is exhausted in the course of recording of received image data, of continuing the recording operation by switching to another ink cartridge.

The foregoing and still other objects of the present invention will become fully apparent from the following description which is to be taken in conjunction with the attached drawings.

BRIEF DESCRIPTION OF THE DRAWINGS

FIGS. 6B, 6B-1, and 6B-2 are flow charts of the control sequence for non-discharge check in the embodiment of the present invention;

FIG. 7 is a schematic perspective view of a full line ink jet recording apparatus constituting another embodiment of the present invention;

FIG. 13 is a flow chart of the control sequence of a main control unit 41 at cartridge loading;

FIG. 21 is a block diagram of a printer unit equipped with two ink cartridges.

DETAILED DESCRIPTION OF THE PREFERRED EMBODIMENTS

Now the present invention will be clarified in detail by embodiments thereof shown in the attached drawings.

Basic structure

Figure 1:
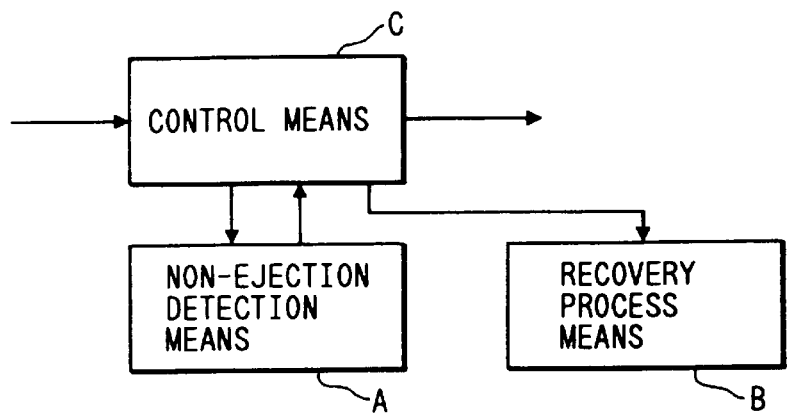
FIG. 1 is a block diagram of the basic structure embodying the present invention.

FIG. 1 is a schematic view showing the basic structure of embodiments of the present invention. There are provided non-discharge detection means A for automatically detecting discharge failure in the ink discharge openings of an ink jet recording apparatus employed as the recording system of a facsimile apparatus; recovery process means B for effecting a recovery process on the ink discharge openings; and control means C for causing said non-discharge detection means A to effect the detection of discharge failure in response to the reception of a call signal, also causing said recovery process means B to effect a recovery process in case a non-discharge in detected, and initiating a reception process after the absence of non-discharge is detected by said non-discharge detection means A.

Also the control means C is capable, for example, of interrupting the reception and/or providing an error alarm if the discharge failure is still detected after repetition of plural times of the detection of ink non-discharge and the recovery process explained above.

Structure of recording system (printer)

Figure 2:
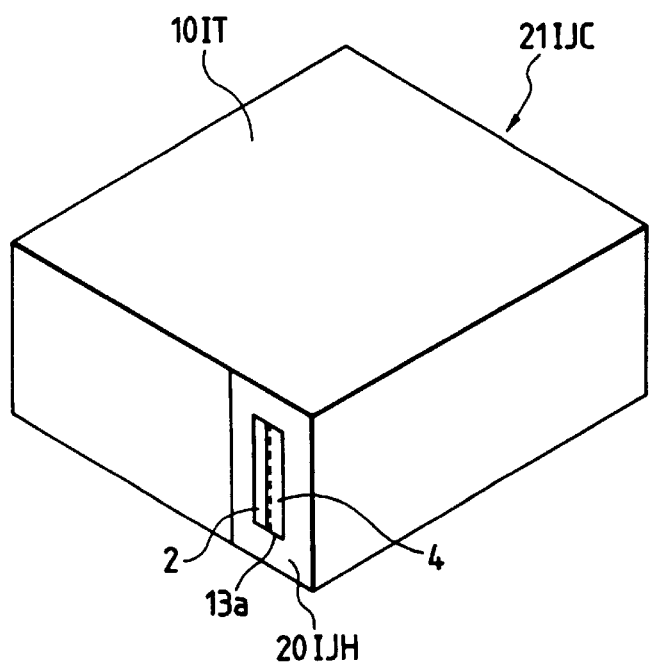
FIG. 2 is a perspective view of an example of the ink jet cartridge of a bubble jet system in which the present invention is applicable.
Figure 3:
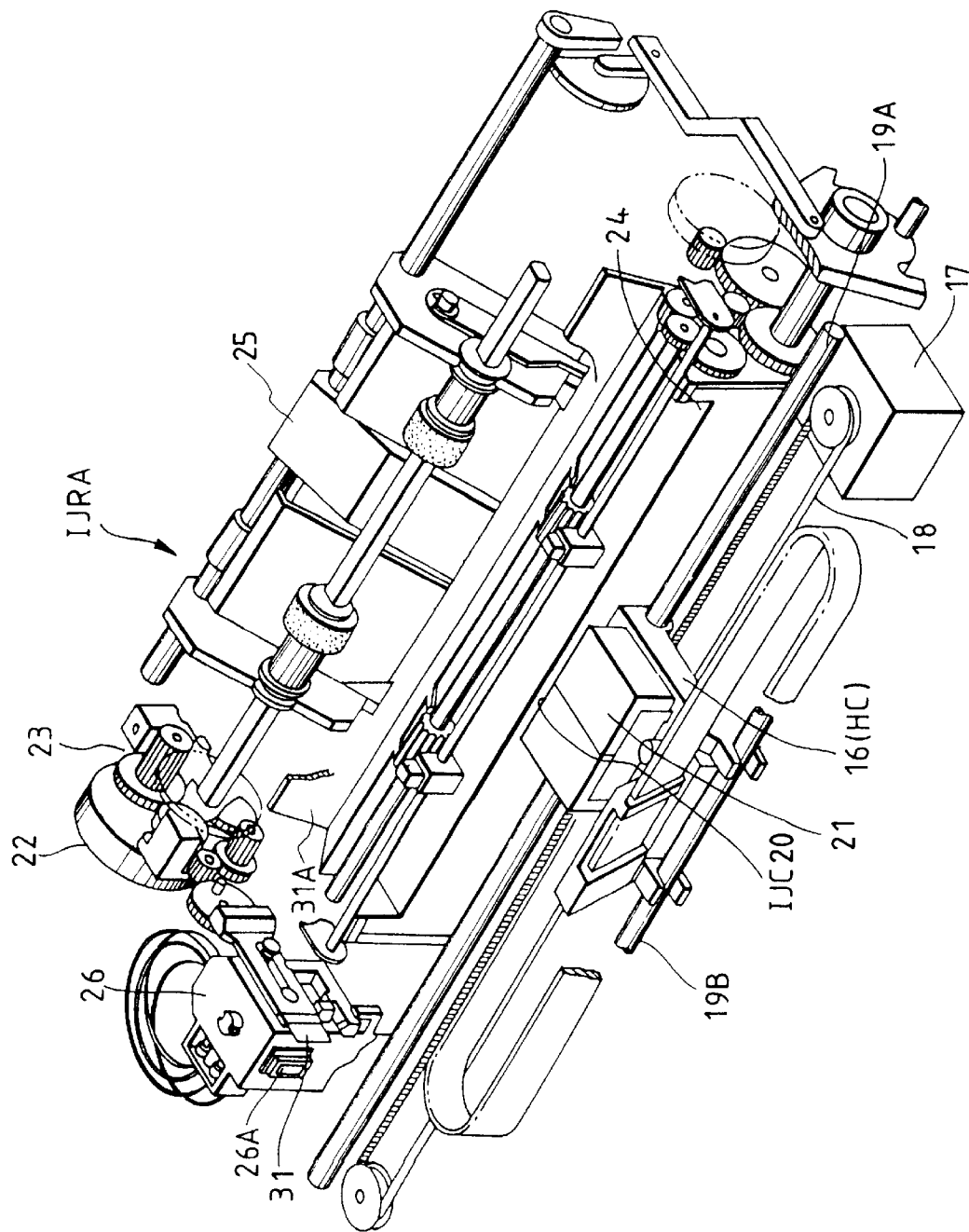
FIG. 3 is a perspective view of an example of the recording system of a facsimile apparatus in which the present invention is applicable, employing the ink jet cartridge shown in FIG. 2.

FIGS. 2 and 3 illustrate an example of an ink jet printer adapted for use as the recording system in a facsimile apparatus constituting an embodiment of the image communicating apparatus of the present invention. There are shown an ink jet head (recording head) 20 of a system for discharging ink toward a recording sheet, utilizing bubbles generated by thermal energy; a detachable ink jet cartridge (IJC) 21 integral with an ink jet head (IJH) 20 and equipped with an ink tank (IT) 10 for supplying ink to said ink jet head; and the main body of the ink jet recording apparatus IJRA.

In the ink jet cartridge 21 of the present embodiment, as will be apparent from a perspective view in FIG. 2, the ink jet head 20 slightly protrudes from the front face of the ink tank 10. Said ink jet cartridge 21 is of a disposable type, detachably mounted on a carriage of the ink jet recording apparatus IJRA as will be explained later.

A first ink tank 10, containing ink for supply to the ink jet head 20, is composed of an ink absorbent member, a container therefor and a cover member for closing said container (both not shown). Said ink tank 10 is filled with ink and supplies said ink to the ink jet head according to ink discharge therefrom.

In the present embodiment, a front plate 4 is composed of a resinous material with high ink resistance, such as polysulfone, polyethersulfone, polyphenylene oxide or polypropylene.

The ink jet cartridge 21 of the above-explained structure is detachably mounted on the carriage HC of the ink jet recording apparatus IJRA explained in the following, and effects formation of a recorded image by relative movement of the carriage HC and a recording material, in response to the entry of a recording signal.

FIG. 3 is a perspective view of an example of the ink jet recording apparatus IJRA equipped with mechanisms for the above-mentioned operations.

Referring to FIG. 3, the ink jet head of the ink jet cartridge 20 is provided with nozzles for discharging ink toward a recording surface of a recording sheet supplied from a sheet feeding unit 25 onto a platen 24. A carriage (HC) 16, for supporting said recording head 20, is linked with a part of a driving belt 18 for transmitting the driving force of a driving motor 17, and is capable of reciprocating over the entire width of the recording sheet by sliding along mutually parallel two guide shafts 19A, 19B.

A head recovery unit 26, positioned at an end of the moving path of the recording head 20, for example at a position corresponding to the home position of the recording head 20, effects capping therefor when activated by a motor 22 through a transmission mechanism 23. In combination with the capping operation by a cap 26A, there is conducted a discharge recovery operation by ink suction (suction recovery) by suitable suction means (for example a suction pump) provided in the recovery unit 26 or by forced discharge of viscosified ink from the discharge openings by pressurizing ink with suitable pressurizing means provided in an ink supply path to the recording head 20 (pressurized recovery). Also the recording head is protected by said capping for example after the recording operation. Such a discharge recovery operation is conducted at the start of power supply, at the replacement of the recording head, or at a pause in the recording operation exceeding a predetermined time.

A wiping blade or a wiper 31, positioned at a side of the head recovery unit 26 and made of silicone rubber, is supported in a cantilever mechanism by a blade support member 31A and is activated also by the motor 22 and the transmission mechanism 23 for engagement with the ink discharging surface of the recording head 20. Thus the blade 31 is made to protrude into the moving path of the recording head 20 at a suitable timing in the course of recording operation thereof or after the discharge recovery operation therefor by the recovery unit 26, thereby wiping the dew, liquid or dust off said ink discharging surface of the recording head 20 by the movement thereof.

Figure 5A:
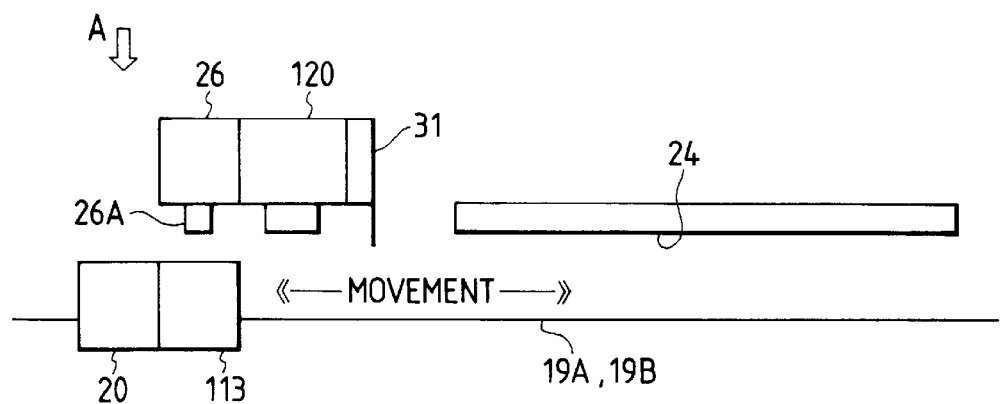
FIG. 5A is a plan view of the arrangement of a non-discharge detection device embodying the present invention.
Figure 5B:
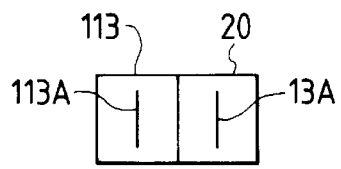
FIG. 5B is a front view of the non-discharge detection sensor shown in FIG. 5A, seen from a direction A shown therein.

Between the platen 20 and the recovery unit 26, there is provided a non-discharge detecting device as shown in FIGS. 5A and 5B.

Structure of control system

Figure 4:
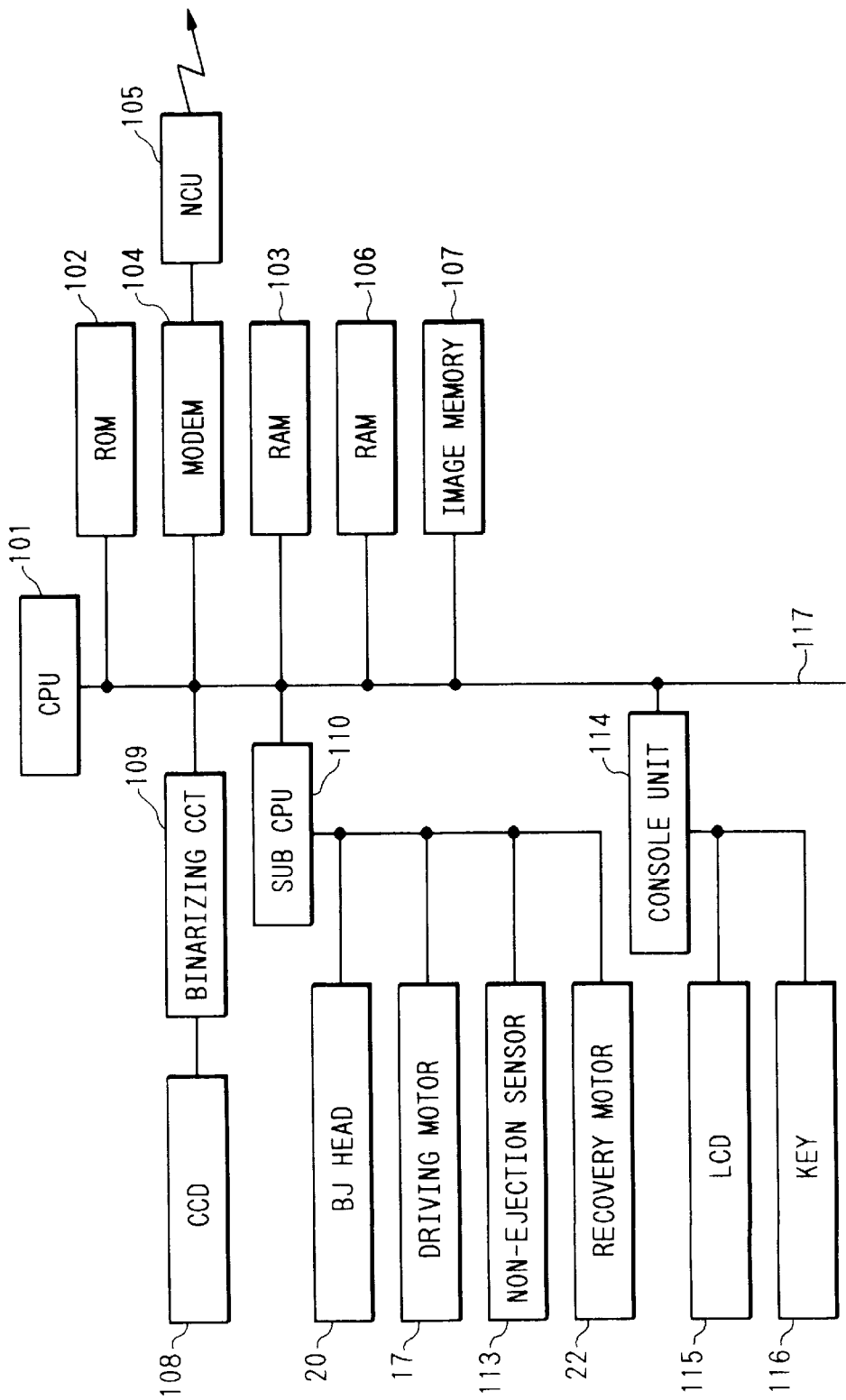
FIG. 4 is a block diagram of an example of the facsimile apparatus embodying the present invention.
Figure 6A:
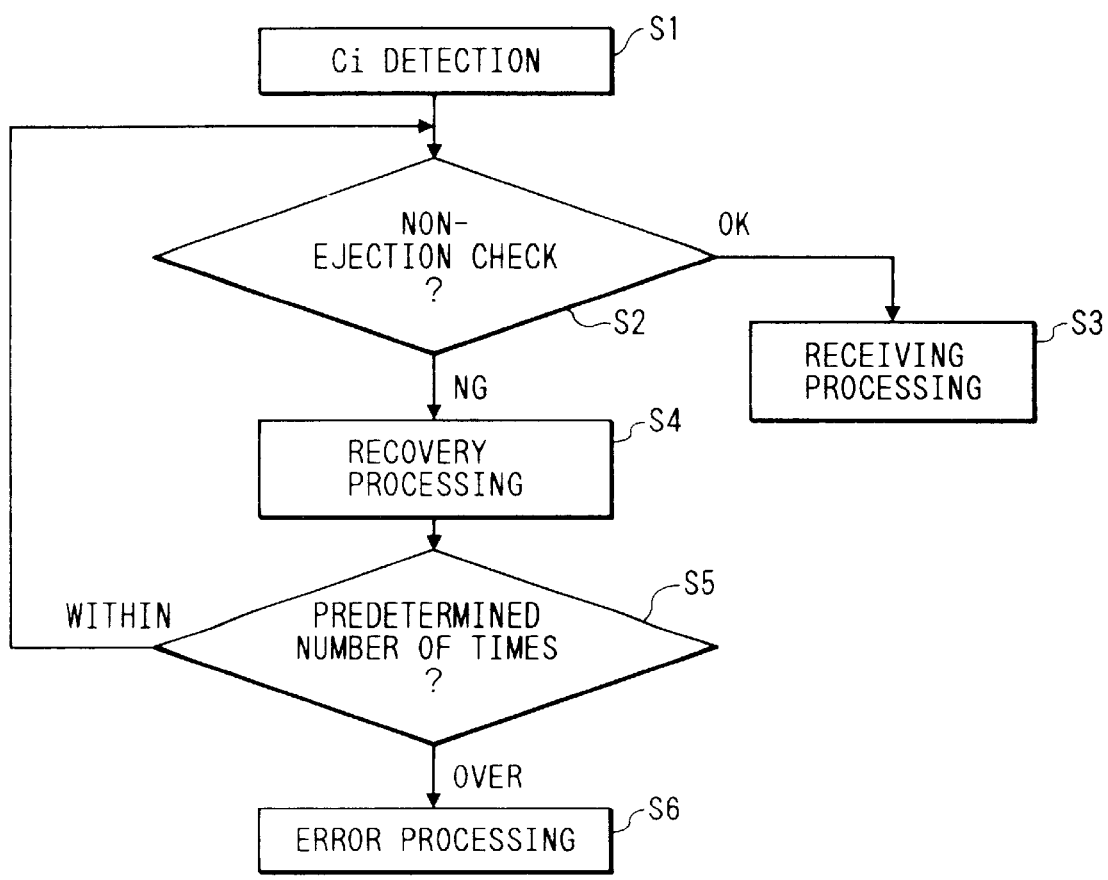
FIG. 6A is a flow chart of the control sequence of an embodiment of the present invention.

FIG. 4 shows an example of the circuit of the facsimile apparatus embodying the present invention, wherein shown are a main CPU (central processing unit) 101 such as a microcomputer for controlling, through a bus 117, the entire apparatus for data transmission and reception; a ROM (read-only memory) 102 for storing various control programs for the CPU 101 as shown in FIG. 6A; a work RAM (random access memory) 103 used as counters and registers of the CPU 101; a modulator-demodulator (modem) 104 for data transmission; a network control unit (NCU) 105 for connecting the modem 104 with a public telephone line; a RAM 106 for registering data such as telephone numbers and abbreviated names; and an image RAM (DRAM) 107 for temporarily storing image data.

A CCD (charge-coupled device) 108, serving as image pickup means of the original reading unit, converts an original image, focused though an imaging lens such as a rod lens array, into an electrical signal. A binary digitizing circuit 109 binarizes the output signal of the CCD 108.

The recording head 20 is incorporated in a recording system, which is composed, in the present embodiment, of an ink jet recording apparatus of bubble jet type as shown in FIGS. 2 and 3. A sub CPU 110 controls the carriage driving motor 17 for moving the recording head (20 in FIG. 2), the recovery motor 22 for driving the recovery unit 26, a non-discharge sensor 113 etc. and is provided with a ROM storing therein control programs for non-discharge check, recovery operation and image recording. Under control by the main CPU 101, the sub CPU 110 thus functions as a control means for detection of a non-discharge condition, for performing recovery processing and for recording an image, respectively, in accordance with the control program being executed. In terms of the basic schematic view shown in FIG. 1, the CPU 101 corresponds to the control means C; the non-ejection sensor 113, under control by the sub CPU 110, corresponds to the non-ejection detection means A; and the recovery motor 22 and recovery unit 26, under control by the sub CPU 110, correspond to the recovery processing means B.

An operation unit 114 is provided with a keyboard containing various keys 116 and a liquid crystal display unit (LCD) 115.

Structure of non-discharge detecting device

FIG. 5A is a plan view of an example of the non-discharge detecting device employed in the present embodiment of the present invention, and FIG. 5B is a front view of a non-discharge sensor seen in a direction A shown in FIG. 5A. The non-discharge detecting device of the present embodiment is composed of a non-discharge detecting unit 120 and a non-discharge sensor 113. The non-discharge detecting unit 120 receives, instead of the ordinary recording sheet, the ink droplets discharged from the recording head 20 at the non-discharge checking operation to be explained later, and is provided, at the front part thereof, for example with a rolled sheet which can be advanced by a winding mechanism (not shown) utilizing a micromotor, or a white board (not shown) on which ink can be deposited and wiped off with an electric wiper (not shown). Said non-discharge detecting unit 120 is positioned either between the recording sheet guided by the platen 24 (cf. FIG. 3) and the cap 26A of the recovery unit 26 or outside said cap 26A and substantially adjacent thereto, in such a manner that said rolled sheet or white board is on substantially the same plane as the printing surface 34 of the recording sheet.

Said non-discharge sensor 113 is provided with a photoelectric converting element array 113A for detecting, in the unit of each dot, the ink discharged from the recording head 20 and deposited on the rolled sheet or the white board of the non-discharge detecting unit 120, and said array 113A is positioned, as shown in FIG. 5B, parallel to the nozzles 13A of the recording head 20 and substantially as long as or somewhat longer than the array of said nozzles. Said non-discharge sensor 113 is mounted on the carriage 16 (cf. FIG. 3) and close to the recording head 20, and the photoelectric converting element array 113A is somewhat retracted from the nozzles of the recording head 20 so as not to contact with the wiper blade 31. A light source for illuminating said rolled sheet may be provided at the side of the non-discharge sensor 113 as in a photointerrupter, or may be positioned at the rear side of the rolled sheet or the semi-transparent white board, in which case the sensor 113 detects the transmitted light.

Figure 5C:
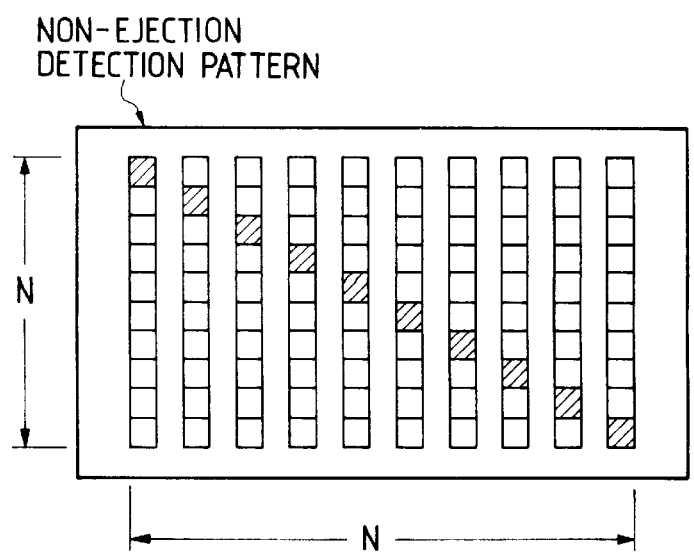
FIG. 5C is a view showing an example of non-discharge detection pattern printed on a detection surface of the non-discharge detecting device.

FIG. 5C shows an example of the non-discharge detecting pattern to be recorded on the non-discharge detecting unit 120. This pattern is obtained by effecting ink discharges from the nozzles in succession, by a nozzle at a time from top to bottom, while the carriage 16 is moved from left to right along the guides 19A, 19B, toward the non-discharge detecting unit 120, wherein the hatched areas indicate the ink deposited positions, and N indicates the number of discharge openings. However the non-discharge detecting pattern is not limited to what has been explained above, and the non-discharge of ink may also be identified for example by discharging ink plural times in succession from the same discharge opening, or by simultaneously discharging ink from each of plural groups in which all the discharge openings are divided, and inspecting whether the average density is same among different groups.

Also in the present embodiment, the presence of the non-discharge detecting unit 120 as shown in FIG. 5A allows to check the non-discharge without smearing the recording sheet, but it is naturally possible also to record the non-discharge detecting pattern directly on a marginal part of the recording sheet and to detect said pattern with the non-discharge sensor 113. Said marginal area can for example be a received message area for recording the date and time of reception and the sender of the received message.

Control sequence of the entire apparatus

In the following there will be explained the control sequence of the present embodiment, with reference to flow charts shown in FIGS. 6A and 6B.

Figures 2, 6B:
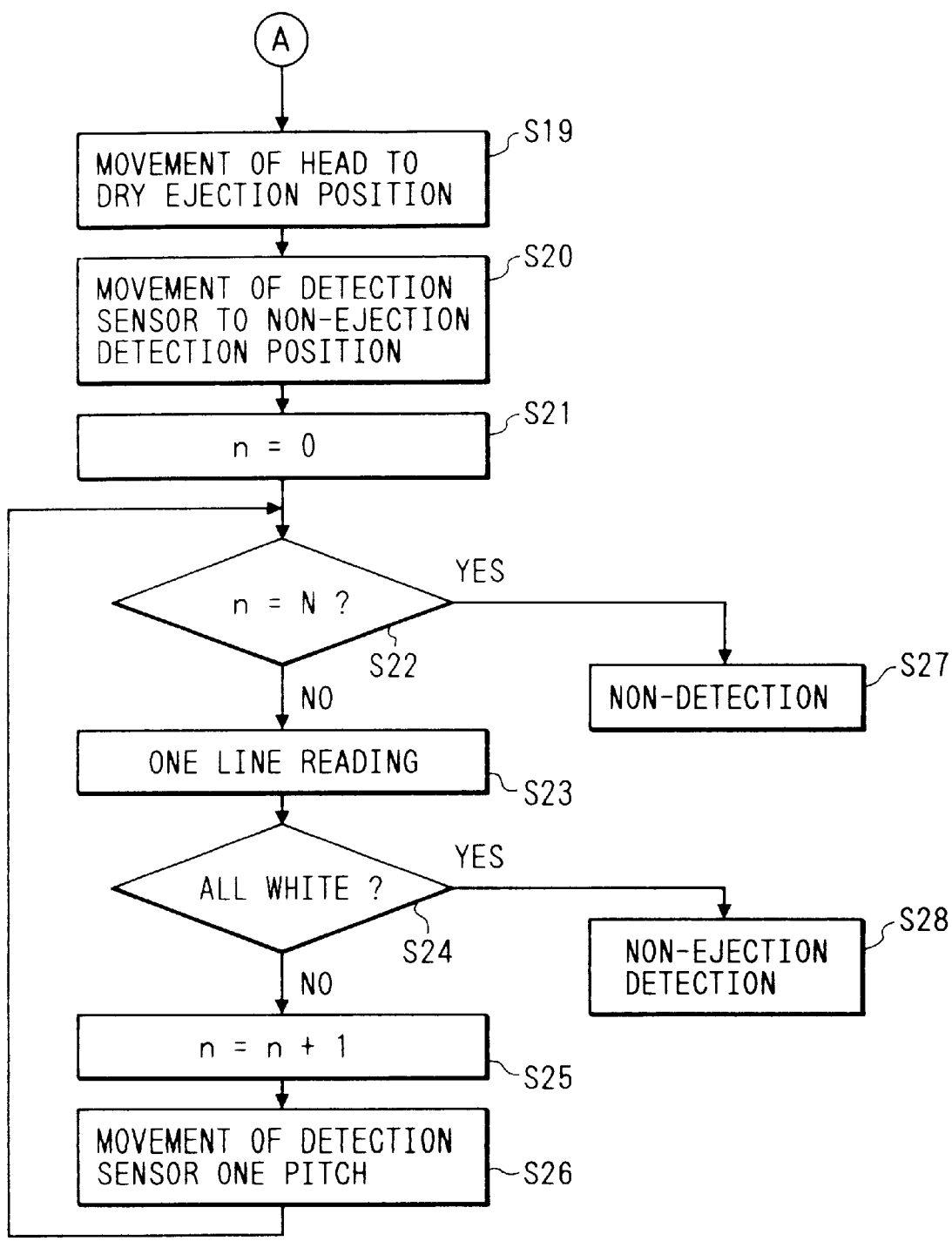

FIG. 6A shows a main routine executed by the CPU 101, while FIG. 6B shows a non-discharge checking subroutine to be executed by the sub CPU 110. At first referring to FIG. 6A, the main CPU 101, upon detecting a call signal Ci of 16 Hz transmitted from an external transmitter through the NCU 105 (step S1) and associated with forthcoming image data, sends an instruction for non-discharge check to the sub CPU 110 (step S2), and controls image data reception to effect a normal reception process only after receiving, from the sub CPU 110, a non-detection (OK) communication indicating the absence of non-discharging openings (step S3). However, in case a detection (NG) response, indicating the presence of non-discharging openings, is received from the sub CPU 110, an instruction for recovery process is given to the sub CPU 110 for effecting the recovery process to be explained later (step S4), and, if the number of recovery processes does not reach a predetermined number (step S5), the sequence returns to the step S2 to repeat the above-explained procedure. If non-discharging openings are still present even after the number of recovery processes exceeds the predetermined number, an error process to be explained later is executed (step S6).

The non-discharge check and the recovery process explained above are conducted in a period after the reception of the Ci signal and before a pre-procedure for discriminating whether or not to effect automatic reception, almost simultaneously with the checks for the presence of recording sheet and for the opened state of the cover of the recording system. Consequently, for practical purposes, the loop of said non-discharge check and recovery process is preferably executed within a period of 10 to 15 seconds, since a period as long as 1 to 2 minutes would be inconvenient also in consideration of the convenience of the transmitting side. Therefore, the usual head recovery process by covering the recording head 20 with the cap 26A and sucking the ink from the discharge openings by a suction motor (not shown) in the recovery unit 26, is not suitable as the recovery operation in the step S4 as it takes a relatively long time.

Thus the recovery process in the step S4 of the present embodiment is conducted, for example, by moving the recording head 20 by the motor 17 to the position of the cap 26A and applying drive pulses to all the heat generating elements of the discharge openings of the recording head 20, thereby effecting plural forced ink discharges, not intended for image recording, toward the cap 26A, from all the discharge openings. The cap 26A need not cover the recording head 20 in this operation, and said ink discharge is conducted while the cap 26A is separated from the recording head 20, and the ink discharged to said cap 26A is recovered in the recovery unit 26. This recovery process is similar to so-called idle ink discharge for preventing the clogging of openings, but the number of discharges is preferably about one order larger (for example 100 times) than that in the idle ink discharge. Also the number of loops in the step S5 is selected at a value matching a tolerable time (for example 15 seconds). Said number of loops in the step S5 may be directly controlled by the time by means of a timer counting the reference clock signals, instead of the count by the counter.

The error process in the step S6 sends an error signal to the transmitting side thereby interrupting the reception, and displays a message for discharge failure on the LCD 115 of the operation unit 114 shown in FIG. 4 or flashes a lamp to inform the operator of the failure in the recording head. Preferably a buzzer sound is given simultaneously. In response to such error information, the operator replaces the loaded ink jet cartridge 21 with a new one, or effects forced ink suction by the head recovery device 26 followed by a non-discharge check, and, if the recovery is not yet achieved, effects ink jet cartridge replacement. For this purpose, the non-discharge check is preferably made instructable from a key 116 of the operation unit.

Control sequence of non-discharge check

In the following there will be explained the details of the non-discharge check in the present embodiment, with reference to a flow chart shown in FIG. 6B. At first, upon receiving an instruction for the non-discharge check from the main CPU 101 (step S10), the sub CPU 110 moves the recording head 20 by the driving motor 17 to the position of the cap 26A, and applies driving pulses to all the discharge openings of the recording head 20, thereby effecting forced idle discharges for example about 10 times (step S11). Then the non-discharge detecting surface of the non-discharge detecting unit 120 shown in FIG. 5A is initialized by advancing the rolled sheet with the micromotor to expose a new sheet surface, or by cleaning the white board with the electric wiper (step S12). Subsequently the recording head 20 is moved by the driving motor 17 and the carriage 16 to the non-discharge detecting position between the platen 24 and the recovery device 26 (step S13), and the count n of an internal counter is set at "0" (step S14).

Then there is discriminated whether said count n has reached the number N of the discharge openings of the recording head 20 (step S15), and, if not, a drive pulse is applied to an n-th (0-th at first) discharge opening to cause ink discharge of a dot (step S16). Then said count n of the internal counter is increased by "1" (step S17), and the motor 17 is activated to shift the recording head 20 by a pitch (step S18). The sequence then returns to the step S15, and the above-explained procedure is repeated until a state n=N is reached.

Upon ink discharge from the last discharge opening of the recording head 20, a non-discharge detecting pattern as shown in FIG. 5C is recorded on the non-discharge detecting surface of the non-discharge detecting unit 120. FIG. 5C shows a state in which discharge failure is absent in all the discharge openings. Thus, if the step S15 identifies n=N, the driving motor 17 is activated to move the recording head 20 to the idle discharge position corresponding to the cap 26A (step S19), then the non-discharge sensor 113 is moved to the non-discharge detecting position of the detecting unit 120 (step S20), and the count n of the internal sensor is set at "0" (step S21).

Then there is discriminated whether said count n has reached the number N of the discharge openings of the recording head 20 (step S22), and, if not, the n-th line is read by the non-discharge sensor 113 (step S23). If said line is white, namely without the discharges of ink (step S24), the detection of non-discharge is informed to the main CPU 101 (step S28). Said informing may be conducted by varying the value of a predetermined flag.

If the step S24 identifies that said line is not all white, the count n of the internal counter is increased by "1" (step S25), then the driving motor 17 is activated to move the non-discharge sensor 113 by a pitch (step S26), and the sequence returns to the step S22 to repeat the above-explained procedure.

If the count n reaches the value N through the repetition of the loop of the steps S22 to S26, all the discharge openings have normally discharged ink without failure, so that the absence of detection of the non-discharge is informed to the main CPU 101 (step S27). Said informing may be conducted, as explained above, by varying the value of a predetermined flag.

The control sequence of the present embodiment is shared by the main CPU 101 and the sub CPU 110, but the present invention is not limited by such embodiment and a similar control operation can naturally be conducted by a single CPU.

Other embodiments

Figure 8:
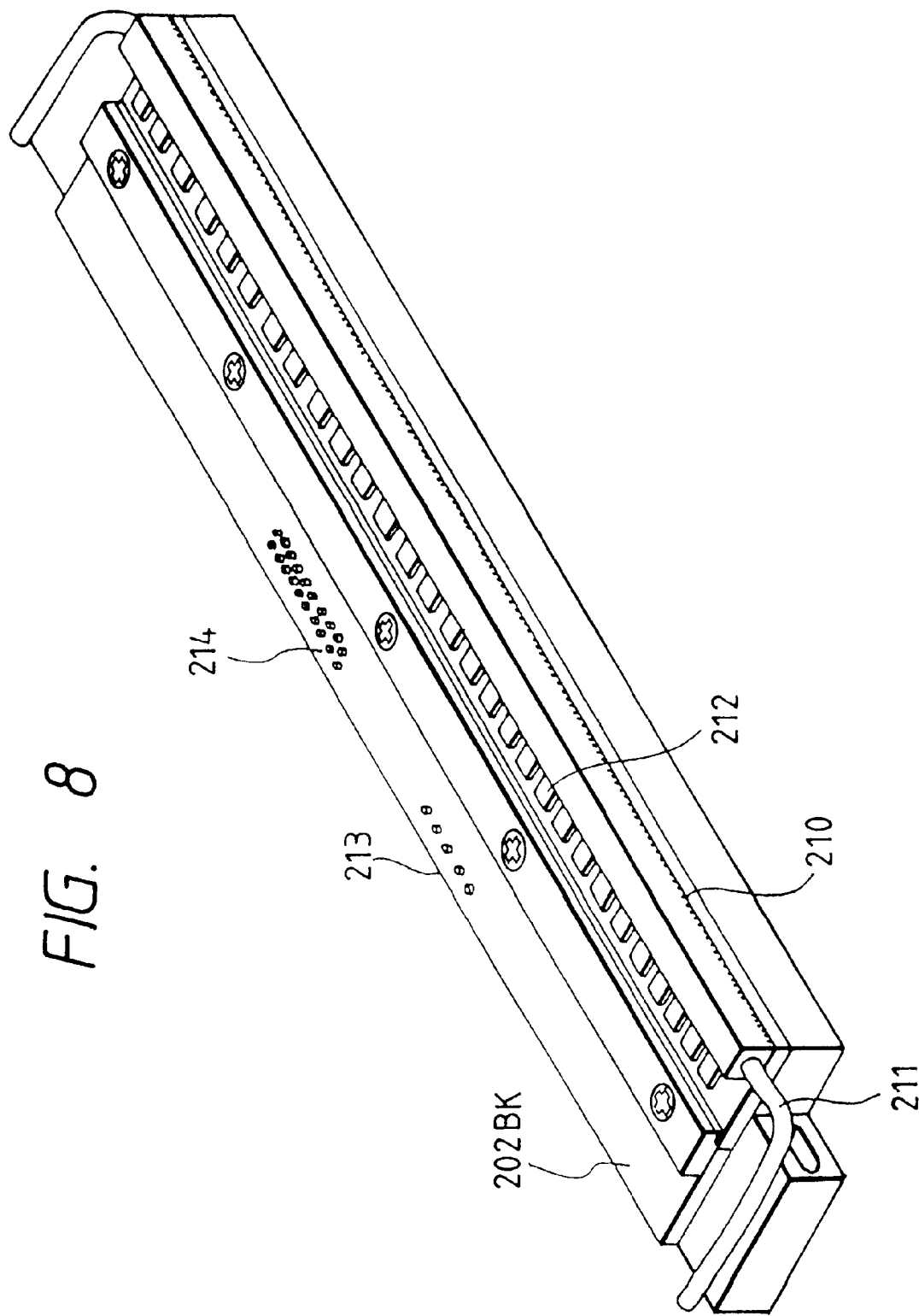
FIG. 8 is a perspective view of the recording head employed in the embodiment shown in FIG. 7.

The present invention is applicable not only to the above-explained serial printer but also to a facsimile apparatus equipped with an ink jet recording apparatus with a recording head of full-line type, having a length corresponding to the maximum width of recording medium recordable by said apparatus as shown in FIGS. 7 and 8.

Referring to FIG. 7, there are shown paired rollers 201A, 201B for supporting and transporting a recording medium R in a sub scanning direction Vs indicated by an arrow; and full-line multi type recording heads 202BK, 202Y, 202M and 202C arranged in this order from the upstream side of the transporting direction of the recording medium R and respectively having nozzles over the entire width of the recording medium R for respectively recording black, yellow, magenta and cyan colors.

A recovery system 200 is brought, at the discharge recovery operation, to a position opposite to the recording heads 202BK–202C instead of the recording medium R. In the present embodiment, however, the number of such discharge recovery operations can be significantly reduced by a preliminary heating conducted at a suitable timing.

FIG. 8 is an external view of one of the recording heads 202BK–202C shown in FIG. 7, and shows ink discharge openings 210, an ink supply pipe 211, plural integrated circuits 212 for driving the electrothermal converting elements, and terminals 213, 214.

Control sequences similar to those shown in FIGS. 6A and 6B may also be employed in applying the present invention to a facsimile apparatus equipped with a printer of such full-line type, but, in such case, the structure can be made relatively simple by discharging the ink directly onto the recording sheet and positioning the non-discharge sensor in the down-stream side in the transporting direction of the recording sheet.

In the following there will be explained still another embodiment of the present invention, with reference to the attached drawings, wherein ink replenishment is conducted from a main tank if non-discharge of ink or ink shortage occurs in the course of a recording operation.

Figure 9:
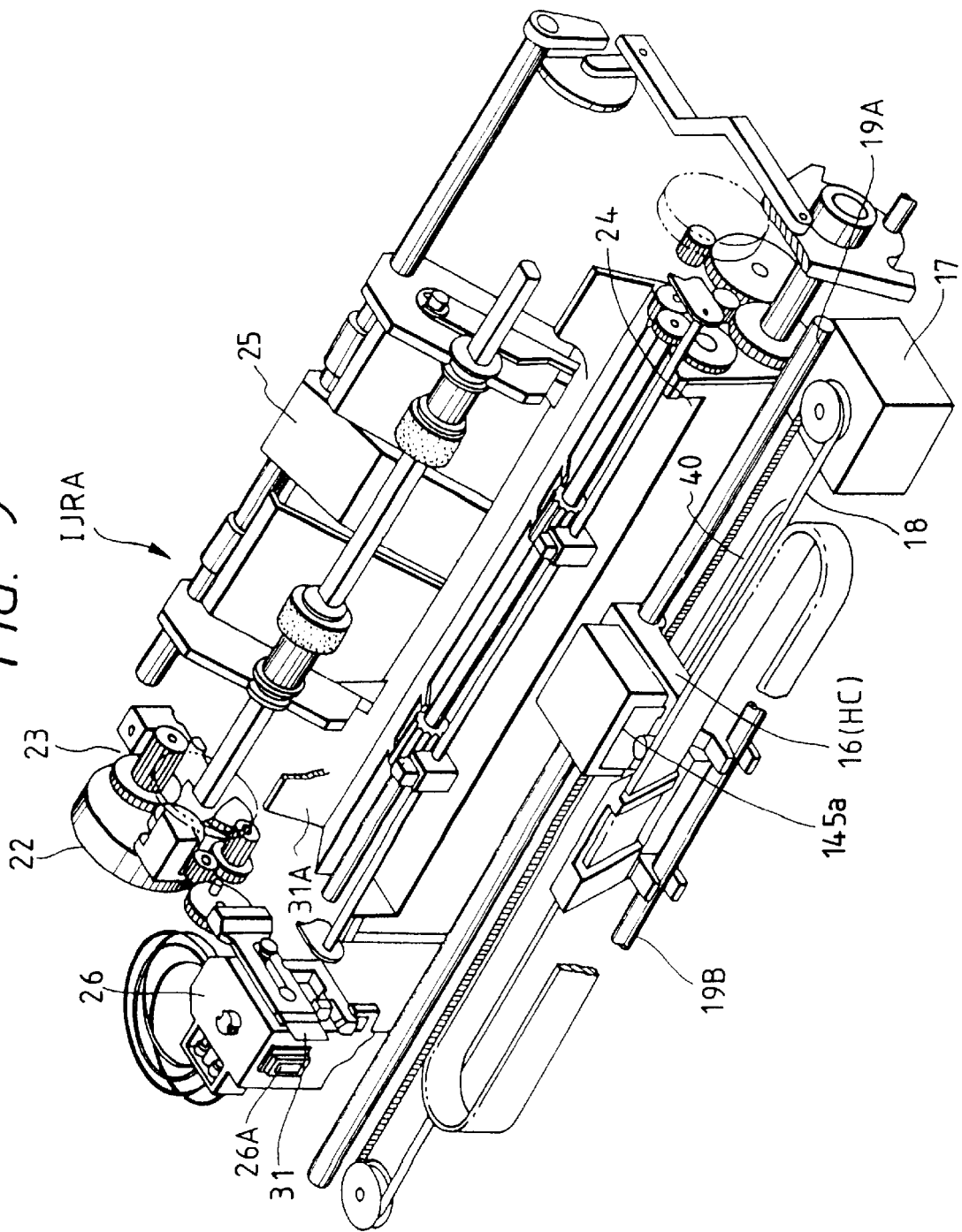
FIG. 9 is an external perspective view of the ink jet printer of said embodiment.

FIG. 9 is an external perspective view of the ink jet recording apparatus of the present embodiment, wherein same components as those in FIG. 3 are represented by same numbers. There is provided an ink jet head 145a provided with plural ink discharge openings. In the present embodiment the non-discharge sensor 113 is dispensed with, and the non-discharge check is conducted by detecting the temperature at the head drive. Also ink is suitably replenished from an unrepresented main tank to a sub tank of the ink jet head 145a, through an ink supply tube 40.

Figure 10:
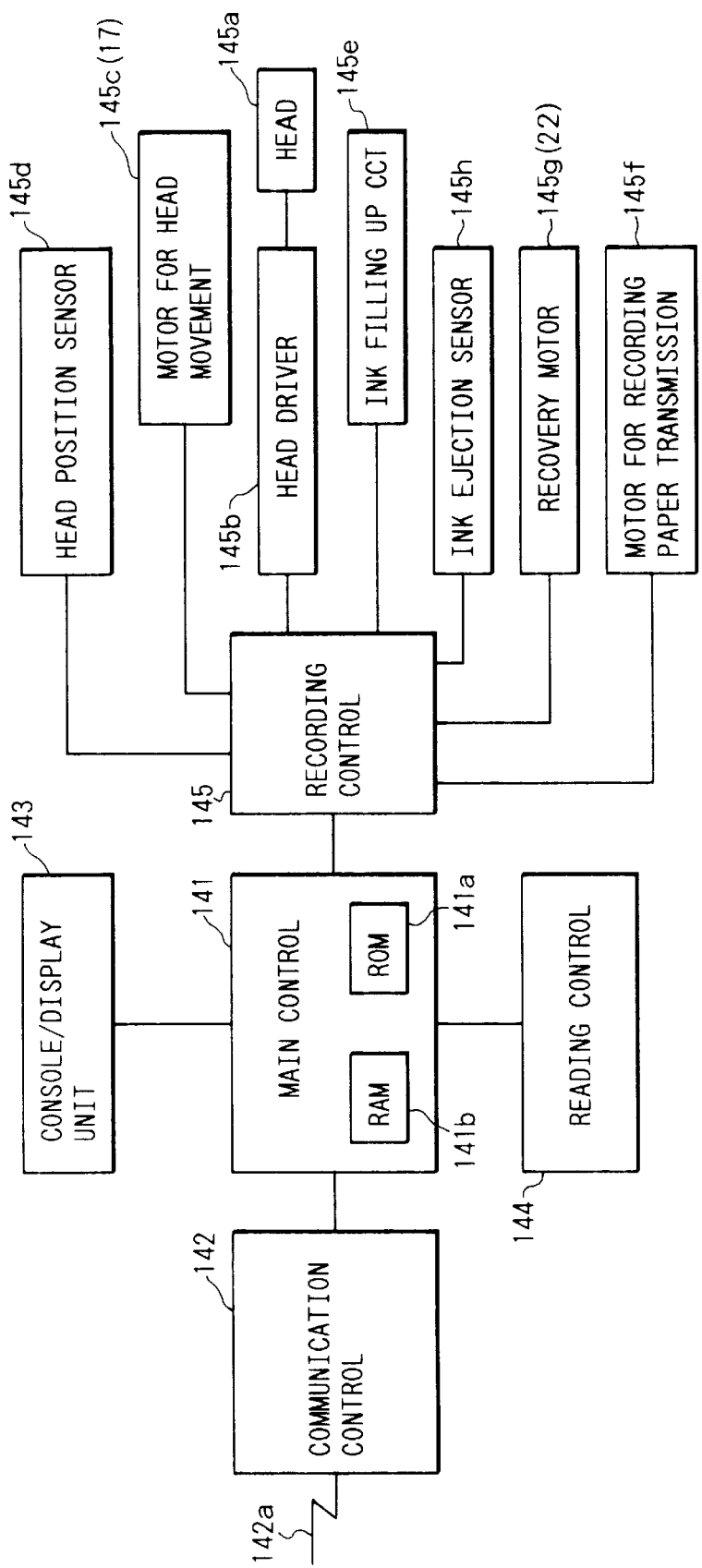
FIG. 10 is a block diagram of the entire facsimile apparatus of said embodiment.

FIG. 10 shows an example of the hardware structure of the present embodiment. A main control unit 141 has a CPU for controlling the various units of the apparatus, according to programs stored in a ROM 141a. A RAM 141b is used for temporarily storing data necessary for the function of the main control unit and for data exchange with various units.

A communication control unit 142 controls the communication means in data communication with external equipment through a communication line, under the control of the main control unit 141. An operation-display unit 143, for interfacing with the operator, effects message displays to the operator and key input entries according to a control program stored in the ROM 141a. A reading control unit 144 reads an original image and enters image data into the RAM 141b of the main control unit 141, in case of image data transmission from this apparatus. A recording control unit 145 controls a printer in recording the data entered from the communication control unit 142 or the reading control unit 144 and stored in the RAM 141b, or the data generated by the main control unit 141. In the present embodiment, said printer is an ink jet printer, of which an ink jet head 145a and an ink jet head driver 145b therefor are controlled by said recording control unit 145. The ink jet head 145a is moved by a head moving motor 145c (corresponding to the motor 17 in FIG. 9) and the head position is confirmed by a head position sensor 145d. Said motor 145c and sensor 145d are also controlled by the recording control unit, which furthermore controls an ink filling circuit 145e for effecting the ink filling to the ink jet head, a sheet transport motor 145f for transporting the recording sheet, and a non-discharge sensor 145h for the ink jet head. In the above-explained hardware structure, the ink jet head is controlled in relation to the communication control conducted by the communication control unit.

In the following there will principally be explained the detection of non-discharge of ink and the ink replenishment or the ink cartridge replacement when the remaining amount of ink becomes low.

Figure 11:
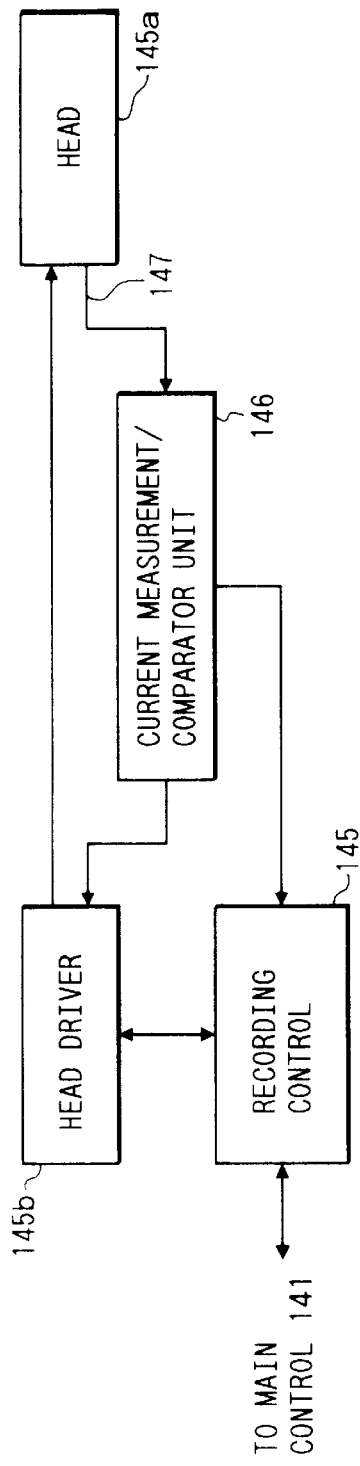
FIGS. 11, 12 and 14 are block diagrams of a printer unit in the first embodiment.

FIG. 11 is a block diagram of a portion of the printer relating to the detection of non-discharge of ink in the present embodiment, wherein same components as those in FIG. 10 are represented by same numbers, and a current measurement/comparator unit 146 as the ink discharge sensor 145h shown in FIG. 10.

In the following there will be explained a case in which, in the facsimile apparatus shown in FIGS. 10 and 11, complete image recording is not possible due to ink discharge failure in the reception and printing of an image. The received image data are decoded in the main control unit 141 and supplied to the recording control unit 145, which effects image recording by releasing head driver signals according to said received image data. If non-discharge of ink occurs in the course of said image recording, the temperature of the head 145a becomes higher than in the normal state because the heat is not taken away by the discharged ink, and the resistance of the heating element in the recording head also varies from the normal state (usually becomes higher). Consequently, when the head driver 145b generates a head driving pulse, the current in a line 147 becomes smaller. Thus, the current measurement/comparator unit 146 measures the current in the line 147, and, if it is smaller than a reference normal value, identifies a non-discharge and informs the same to the main control unit 141 through the recording control unit 145. In response the main control unit 141 terminates the communication through the communication control unit 142.

In case of a facsimile apparatus employing a replaceable ink jet cartridge including the recording head and the ink tank as shown in FIG. 2, said reference current value has to be determined for each cartridge, because the electric resistance may fluctuate from cartridge to cartridge. For this purpose it is necessary to detect the replacement of the ink jet cartridge, and to store the current at the initial ink discharge after cartridge replacement as the reference current value.

Figure 12:
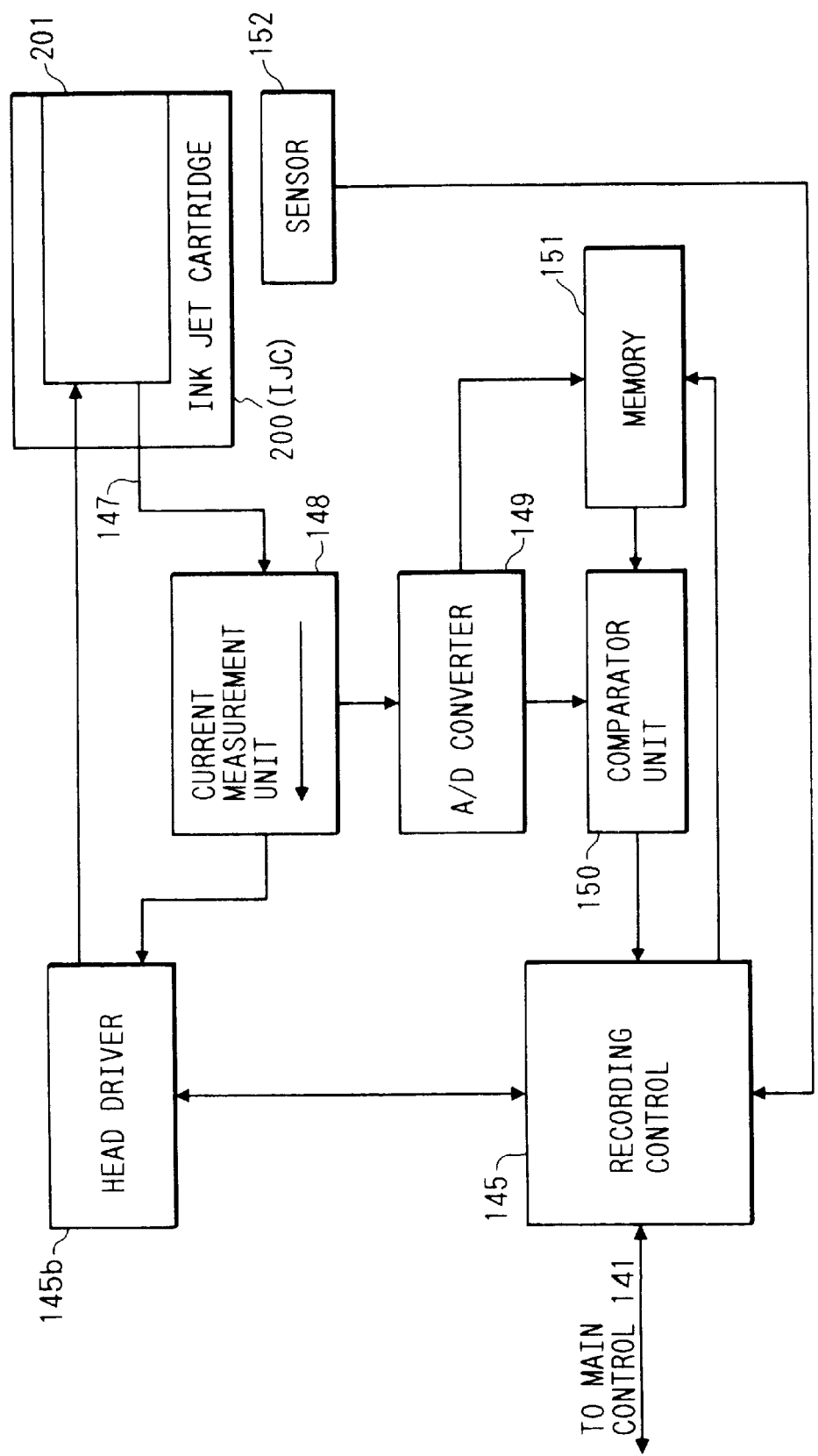

Such embodiment is shown in FIG. 12, wherein shown are an ink jet cartridge 200 including a recording head and an ink tank as shown in FIGS. 2 and 3; a current measurement unit 148 for measuring the current in a line 147; an A/D converter 149 for converting the analog data measured by said unit 148 into digital data; a memory 151 for storing the reference current value; a comparator 150 for comparing the data from the A/D converter 149 with those stored in the memory 151; and a sensor 152 for detecting whether the ink jet cartridge 200 is mounted.

In such facsimile apparatus, the function is similar to that explained above, in case complete image recording is not possible due to ink discharge failure in the reception and printing of an image. In the presence of non-discharge, the resistance of the ink discharging heater element of the head 201 becomes higher than in the normal state, and the current in the line 147 becomes smaller when the head driver 145b generates a pulse. The current measurement unit 148 measures the current in said line 147, and the A/D converter 149 converts the measured analog value into digital data. The comparator 150 compares thus obtained digital value with the reference current value (current at the initial ink discharge after cartridge replacement) stored in the memory 151, and, if the former is smaller, identifies a non-discharge and informs the same to the main control unit 141 through the recording control unit 145. In response the main control unit 141 terminates the communication through the communication control unit 142.

Then explained is the function when the ink jet cartridge 200 is replaced. The sensor 152 sends information on whether the ink jet cartridge 200 is mounted, through the recording control unit 145, to the main control unit 141, which checks said information at suitable timings, according to a flow chart shown in FIG. 13. At first the main control unit 141 confirms whether the ink jet cartridge is mounted (step S1), and also checks a flag indicating the presence or absence of the cartridge previously (step S2 or S6). The ink jet cartridge is provided with a resistor member, which forms a feedback loop upon proper mounting of the cartridge, thereby allowing to detect the mounting of the cartridge. Said flag is "1" or "0" respectively in the presence or absence of the cartridge, and is initialized to "0". If the ink jet cartridge is not currently mounted but the flag is "1", it is cleared to "0" (step S7). If the ink jet cartridge is currently mounted but the flag is "0", it is set at "1" (step S3), and an instruction for an ink discharge from the recording head 20 is sent to the head driver 145b through the recording control unit 145 (step S4). In this state the current measurement unit 148 measures the current in the line 147, and the data digitized by the A/D converter 149 are stored in the memory 151 (step S5). This stored value is used as the reference current value for detecting the discharge failure (in practice a certain margin has to be given to said measured value to obtain the reference current value), so that the non-discharge state can be correctly detected even if the normal current fluctuates from cartridge to cartridge.

Figure 14:
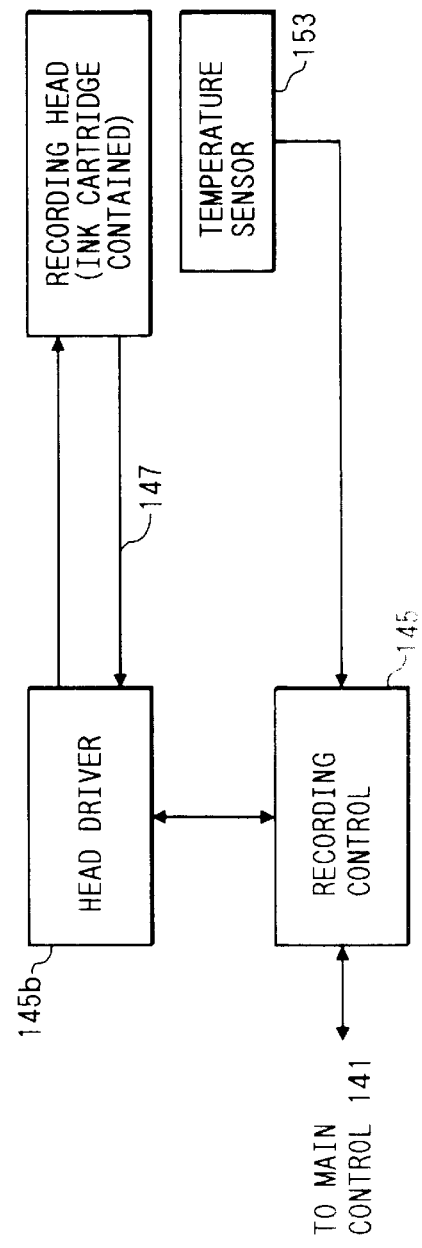

In the above-explained embodiment the temperature change in the recording head is converted into a change in the current therein for detection, but it is also possible to mount a temperature sensor 153 on the recording head 20 as shown in FIG. 14 and to detect the non-discharge state when said sensor 153 detects that the head temperature becomes higher than the normal value.

The above-explained embodiment is to detect the non-discharge of ink from a temperature change in the recording head and to terminate the communication in such case, thereby providing an advantage that the sender can know that exact image information cannot be obtained by the receiver.

In the following there will be explained still another embodiment in which the remaining ink amount in the ink jet cartridge is detected and ink is automatically replenished into the cartridge when said remaining amount becomes low.

Figure 15:
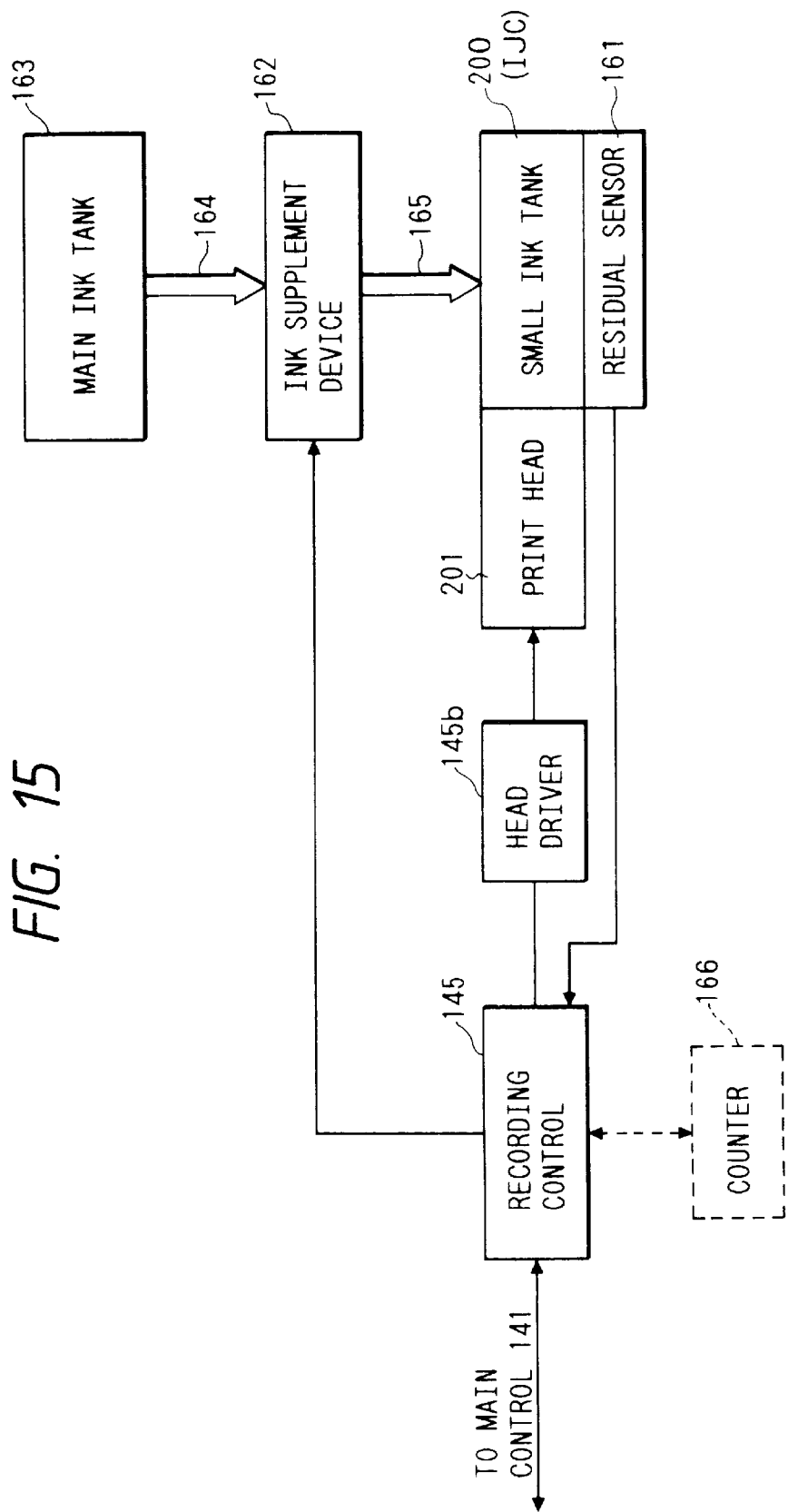
FIG. 15 is a block diagram of a printer unit equipped with an ink replenishing mechanism.

FIG. 15 is a block diagram showing the structure for ink replenishment, wherein same components as those in FIG. 10 are represented by same numbers and will not be explained further.

There are shown a residual amount sensor 161 for detecting the residual amount of ink in a small ink tank provided in the ink jet cartridge 200; an ink replenishing device 162 (corresponding to the ink filling circuit 145e) for replenishing the ink from a main ink tank 163 to the ink jet cartridge 200 in response to an ink replenishing command sent from the main control unit 141 through the recording control unit 145; and ink pipes 164, 165.

If the residual ink amount in the small ink tank in the ink jet cartridge 200 becomes low in the course of recording of an image received from another facsimile apparatus as in the foregoing embodiment, the residual amount sensor 161 detects such low residual amount and informs the main control unit 141 through the recording control unit 145. The main control unit 141 causes the recording head 201 to continue the image recording until the end of current communication, and, upon completion of said communication, causes the main ink tank 163 to replenish ink into the small ink tank in the ink jet cartridge 200.

Also in case the number of pages that can be printed after the detection of low residual ink amount in the ink jet cartridge by the sensor 161 is limited and image data of a number of pages exceeding said printable number of pages are received after said detection, the communication has to be terminated when said printable number of pages is exceeded, since otherwise all the pages cannot be printed.

Figure 16:
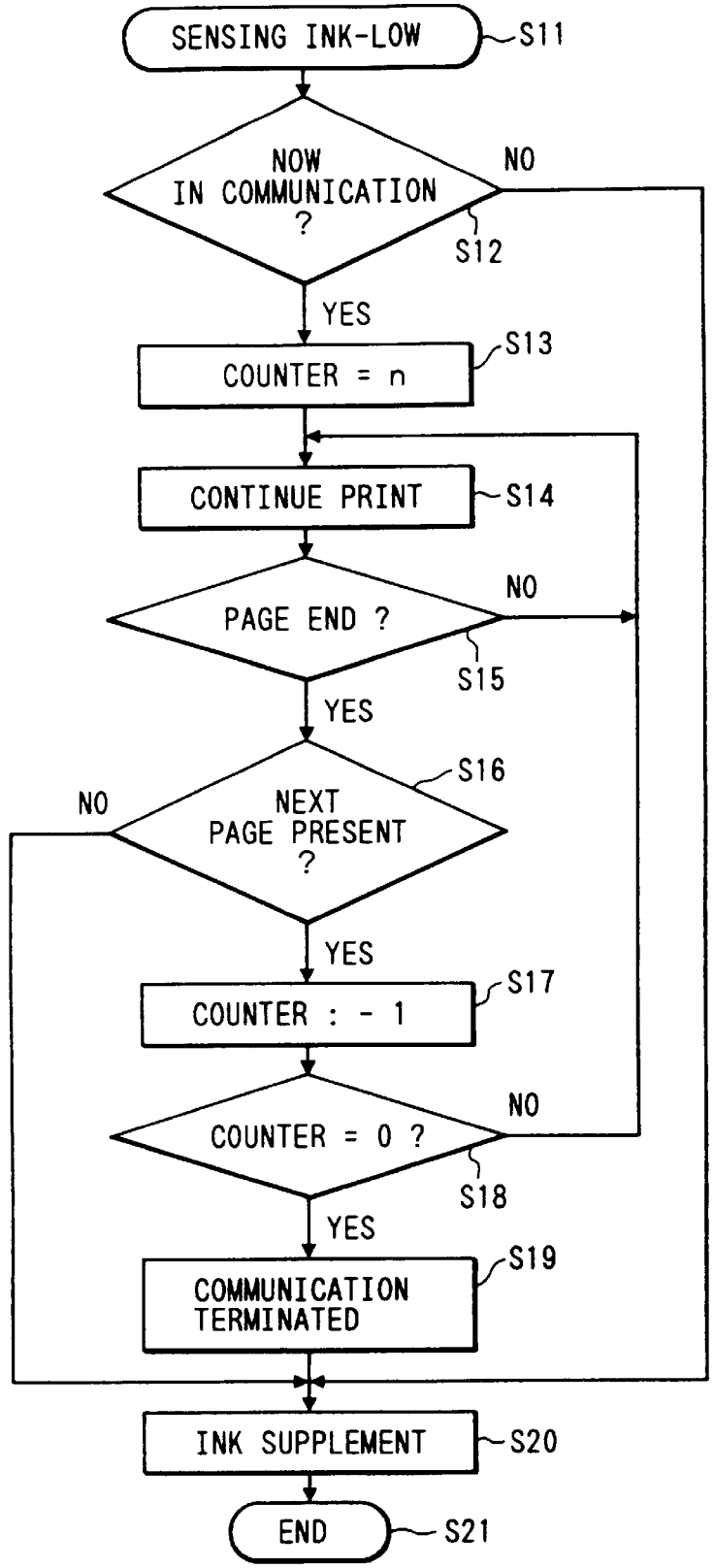
FIG. 16 is a flow chart of the control sequence of a main control unit 141 shown in FIG. 15.

For this purpose there is provided a counter 166 for counting the number of recorded pages. In the following there will be explained the function of the main control unit 141, with reference to a flow chart shown in FIG. 16, wherein n indicates the number of printable pages after the detection of the low residual ink amount in the ink jet cartridge 200 by the residual amount sensor 161.

When the residual amount sensor 161 detects the low residual ink amount in the ink jet cartridge and said detection occurs in the course of a communication (steps S11, S12), a value n is set in the counter 166 (step S13) and the printing operation of the currently printed page is continued until the end of said page (steps S14, S15). Then, if a next received page is present (step S16), the count of the counter 166 is reduced by "1" (step S17). Then there is discriminated whether said count has reached "0" (step S18), and, if not, the printing operation is continued until the end of said page (step S14). If said count has reached "0", the communication is interrupted by the communication control unit 142 (step S19) by an error process, and the ink replenishment is conducted by the ink replenishing unit 162 (step S20). The ink replenishment is conducted immediately if the step S12 identifies that the communication is not in progress or the step S16 identifies the absence of next page.

Therefore, even when the number of printable pages after the detection of low remaining ink amount in the small ink tank of the ink jet cartridge is limited, the communication is interrupted when said number of pages is exceeded, so that there can be prevented the normal termination of communication without proper printing of the received images. It is also possible, instead of interrupting the communication by an error process, to store the subsequently received pages in an image memory in the step S19 (memory substituted reception), to effect the ink replenishment during said reception and to re-start the printing of the pages stored in said image memory after the completion of ink replenishment.

In the above-explained embodiment, the residual ink amount is detected by the residual amount sensor 161 directly attached to the recording head 201, but it is also possible to estimate the residual ink amount in the ink jet cartridge by counting the number of ink dots discharged from the head 201 by means of the main control unit 141.

Also in FIG. 15 the counter 166 is shown as an independent counter, but it may be composed of a memory or a register present in the main control unit 141.

The above-explained embodiment, in which, if a low residual ink amount is detected in the course of printing operation of a received image, the ink replenishment is conducted after the termination of the communication, provides advantages of preventing an unnecessary prolongation of communication and an elevated charge for communication.

In the foregoing embodiment, the ink is replenished to the ink jet cartridge from the main ink tank 163 when the residual ink amount in said ink jet cartridge becomes low, but it is also possible to switch two or more recording heads according to the residual ink amount. In the following there will be explained an embodiment in which two heads are selectively switched.

Figure 17:
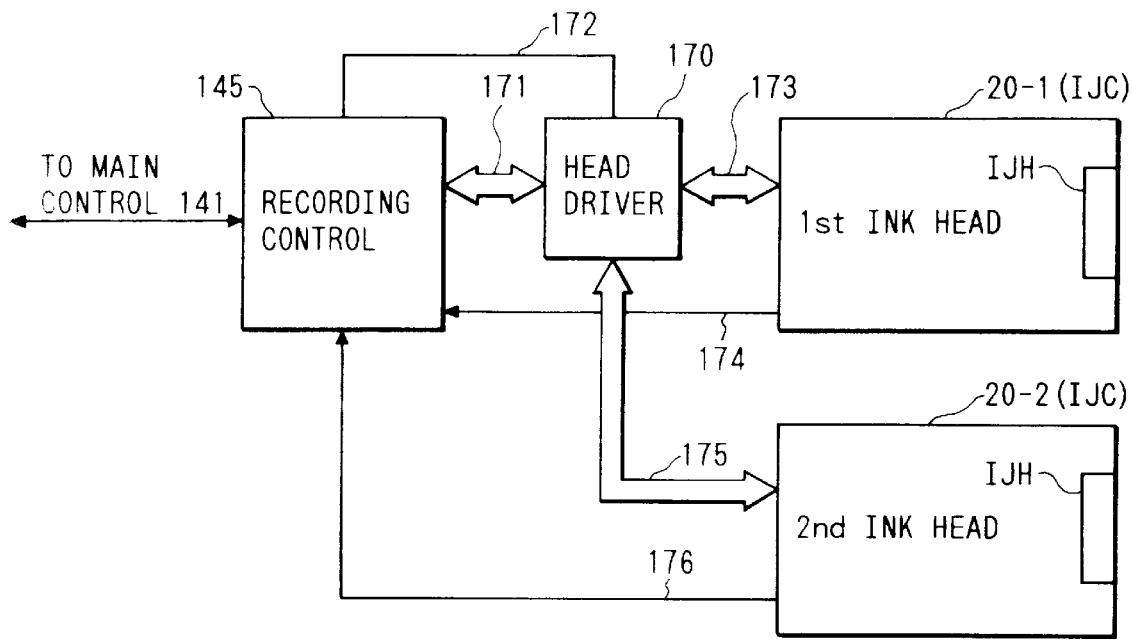
FIG. 17 is a block diagram of a printer unit equipped with plural ink jet cartridges.
Figure 18:
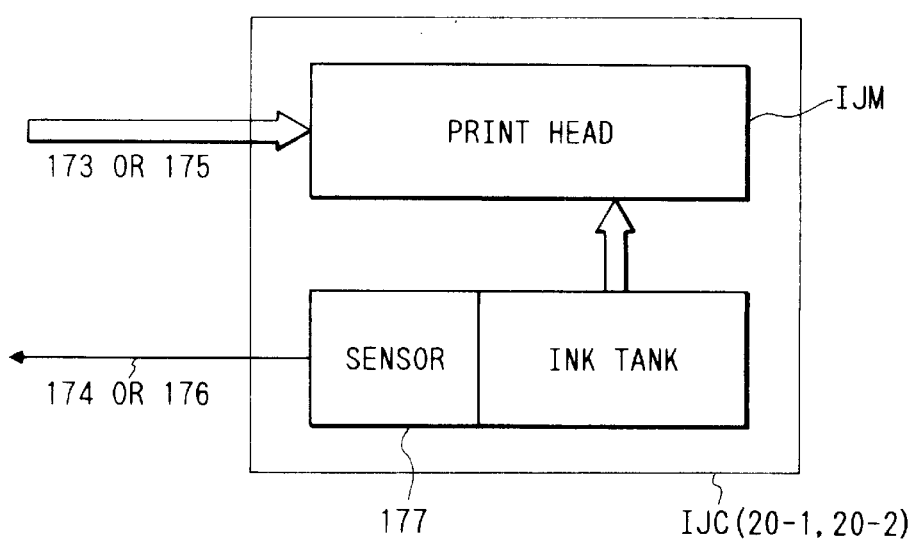
FIG. 18 is a view showing the internal structure of the recording head.

FIG. 17 shows the structure of a printer unit employing two ink jet cartridges. There are provided first and second heads 20-1, 20-2, each similar to that 20 shown in FIG. 2. A head driver 170 switches the output drive signal, in response to a switching instruction signal supplied from the main control unit 141 through the recording control unit 145 and a signal line 172. There are also provided bus lines 171, 173, 175 for sending head drive signals corresponding to image data; and low-ink signal lines 174, 176 for the signals released from said heads 20-1, 20-2. FIG. 18 shows the internal structure of the head 20-1 or 20-2, in which provided is a sensor 177 for detecting the absence of ink in the ink jet cartridge.

In such facsimile apparatus, the main control unit 141 decodes the image data, received from another facsimile apparatus through the communication control unit 142, into image signals and sends said image signals to the bus 171 through the recording control unit 145 for printing by the head 20-1 or 20-2. When the first head 20-1 is used, the head driver 170 connects the bus 171 with the bus 173 while the bus 175 is disconnected. Upon receiving the image signals from the bus 173, the printing head IJH of the head 20-1 prints an image by discharging the ink received from the ink tank in the ink jet cartridge.

Figure 19:
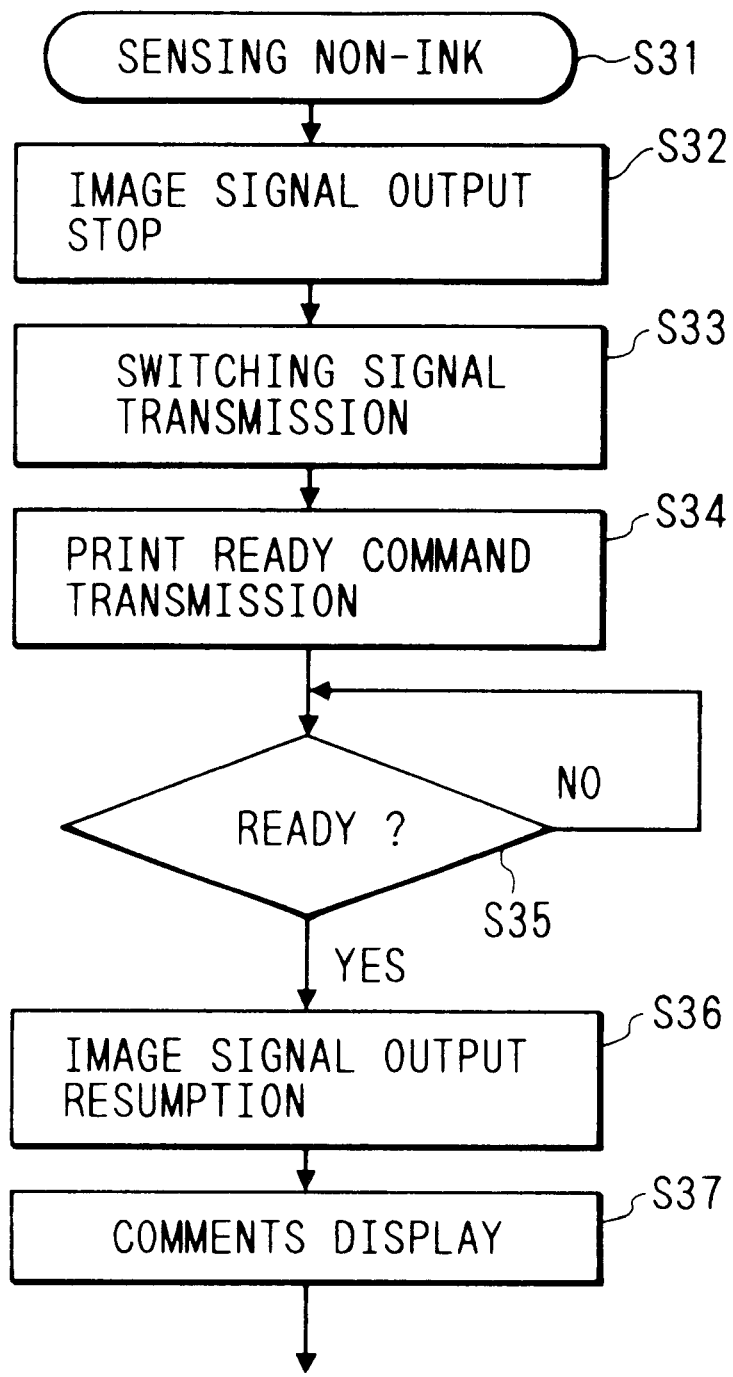
FIG. 19 is a flow chart of the control sequence of a main control unit 141 in a 3rd embodiment.

In the following there will be explained the operation, with reference to FIG. 19, in case the ink in said ink tank runs out in the course of printing of the received image. In this case the sensor 177 detects the absence of ink and sends information on the absence of ink to the main control unit 141 through the signal line 174 and the recording control unit 145. Upon detecting the absence of ink in a step S31, the main control unit 141 interrupts the output of image signal to the bus 171 at the end of recording of a page (step S32), and sends a switching command signal to the head driver 170 through the recording control unit 145 and the switching signal line 172, in order to switch the head from 20-1 to 20-2 (step S33), for example by shifting the voltage level of the line 172 from high to low. In response the head driver 170 connects the bus 171 with 175 and disconnects the bus 173, and sends a command through the buses 171, 175 for preparing the second head 20-2 for the printing operation, such as by the idle ink discharge explained before (step S34). In response to said command and as soon as becoming ready for the printing operation, the second head 20-2 sends a ready command to the main control unit 141 through the buses 175, 171 and the recording control unit 145. Upon receiving said command (step S35), the main control unit 141 re-starts the interrupted output of the image signal to the recording control unit 145 and the bus 171 (step S36). Thus the first head 20-1 terminates the image printing operation, and the second head 20-2, still containing the ink, initiates the image printing operation instead. Consequently, even when the ink runs out, the heads are automatically and promptly switched so that the communication need not be interrupted.

Figure 20:
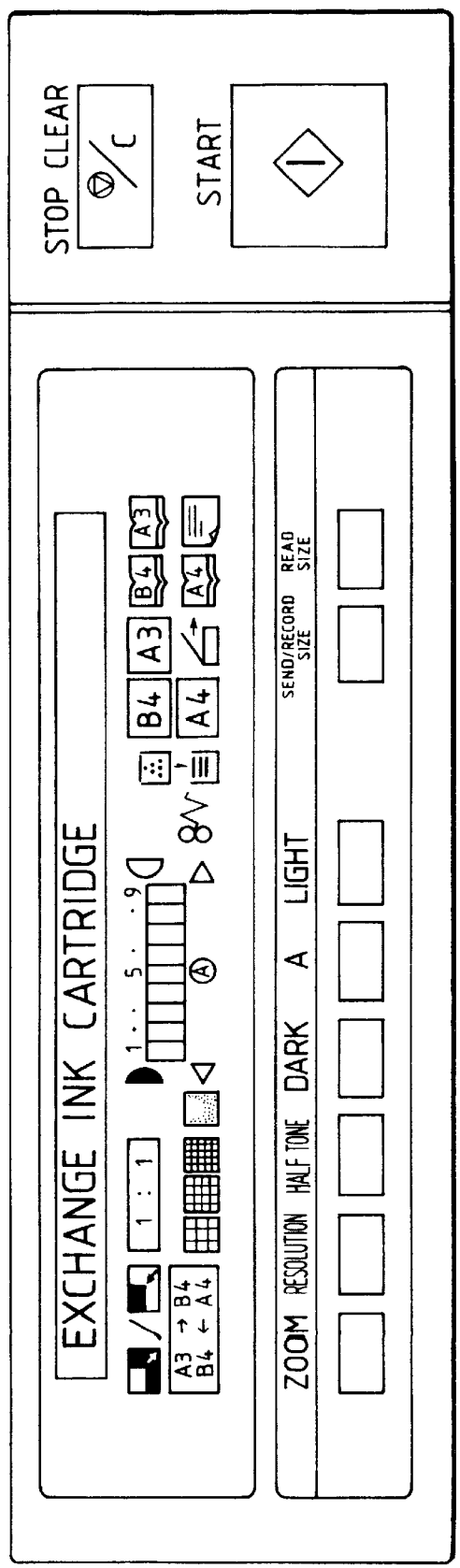
FIG. 20 is a view showing an example of display on a display panel.

Also the operation/display unit 143 displays a message as shown in FIG. 20 (step S37) informing the operator of the absence of ink in the first head 20-1 and requesting the head replacement, whereby prevented is a situation in which the printing operation is disabled by the absnece of ink in two ink jet cartridges.

In the foregoing there has been explained a case in which the ink runs out in the first head 20-1 in the course of use thereof, but the operation is same also in case the ink of the second head 20-2 runs out in the course of use thereof and the head is switched to 20-1.

In the foregoing explanation there has been employed two ink jet cartridges, but a similar process is applicable in case three or more cartridges are employed.

The foregoing embodiment showed an ink jet facsimile apparatus employing an ink jet cartridge in which an ink tank and a recording head are integrated as shown in FIG. 18. In contrast, FIG. 21 shows a case in which the ink cartridge is composed solely of an ink tank and a sensor. There are shown a recording head 180, a switching valve 182, a first ink cartridge 187, a second ink cartridge 190, ink tanks 185, 188 therein, sensors 186, 189 for detecting the absence of ink in said ink tanks 185, 188, and pipes 181, 183, 184 for supplying ink to the recording head 180.

In such ink jet facsimile apparatus, when the first ink cartridge 187 is in use, the switching valve 182 connects the pipe 181 with 183 and disconnects the pipe 184. If the ink runs out in the ink cartridge 187 in the course of printing of a received image, the sensor 186 sends a signal, indicating the absence of ink, to the main control unit 141, which, in response, interrupts the output of image signal after the completion of recording of a page, and sends a switching signal to the switching valve 182 for switching the ink cartridge from 187 to 190. In response the switching valve 182 connects the pipe 181 with the pipe 184 and disconnects the pipe 183. Then the main control unit 141 re-starts the interrupted output of the image signal. In this manner the interruption of the communication can be avoided even when the ink runs out, by automatic switching of ink cartridges.

As explained in the foregoing, the use of plural ink cartridges with switching to another when the ink runs out in one of said cartridges in use provides an advantage of allowing to continue the communication and the printing operation, as the operator is not required an immediate cartridge replacement.

The present invention is not limited to the foregoing embodiments but is subject to various modifications.

Among various ink jet recording methods, the present invention is particularly advantageously applicable to the recording head and recording apparatus of bubble jet system, because such system has the ability of attaining higher density and definition in the recording.

The representative structure and principle of such bubble jet system are preferably based on the basic principle disclosed for example in the U.S. Pat. Nos. 4,723,129 and 4,740,796. This system is applicable to so-called on-demand type and continuous type ink jet recording, but is particularly effective in the on-demand recording, by providing an electrothermal converting element positioned corresponding to each liquid path or a sheet containing liquid (ink) with at least a drive signal corresponding to the recording information and inducing a rapid temperature increase exceeding nucleate boiling, thereby causing said converting element to generate thermal energy for inducing film boiling on a heat action surface of the recording head, thus generating a bubble in said liquid (ink) corresponding one-to-one to said drive signal. The liquid (ink) is discharged from a discharge opening by the expansion and contraction of said bubble, thereby forming at least a droplet. A pulse-shaped driven signal is particularly preferable as it achieves immediate expansion and contraction of the bubble, thereby realizing highly responsive ink discharge. Such pulse-shaped drive signal is preferably that disclosed in the U.S. Pat. Nos. 4,463,359 and 4,345,262. A further improved recording can be achieved by the conditions disclosed in the U.S. Pat. No. 4,313,124 concerning the temperature increase rate of said thermal action surface.

The present invention includes the structures of the recording head not only obtained by the combinations of discharge openings, liquid paths and electrothermal converting members disclosed in the above-mentioned patents (those with linear or rectangularly bent liquid paths), but also the structures disclosed in the U.S. Pat. Nos. 4,558,333 and 4,459,600 in which the thermal action portion is provided in a bent area. In addition the present invention is also effective in a structure having a common slit as the discharge opening for plural electrothermal converting elements as disclosed in the Japanese Patent Appln. Laid-Open No. 59-123670 or a structure having an aperture for absorbing the pressure wave of thermal energy corresponding to the discharge opening as disclosed in the Japanese Patent Appln. Laid-Open No. 59-138461, because the recording can be securely and efficiently conducted regardless of the form of the recording head.

Also in the present invention, there is preferably added recovery means or auxiliary means for the recording head, such as capping means, cleaning means, pressurizing means or suction means, preliminary heating means composed of electrothermal converting elements and/or other heating elements, and means for effecting a preliminary discharge mode different from that for image recording, in order to achieve stable recording operation.

Also there may be employed not only a recording head for a single ink but also plural recording heads corresponding to plural inks different in colors and/or density.

What is claimed is:

1. An image communicating apparatus provided with a recording head for forming images on pages of recording material by discharging ink from discharge openings, comprising:

plural ink container means, at least one of which is switched for use in supplying ink to the discharge openings;

detection means for detecting an amount of residual ink in each of said at least one ink container means; and switching means for switching use of the at least one ink container means, according to a result of detection by said detection means, wherein when said detection means detects an absence of ink in said at least one ink container means during recording of one page, said switching means switches use of the at least one ink container means into that of another of said plural ink container means after the page has been recorded.

2. An apparatus according to claim 1, further comprising means for indicating the result of detection by said detection means.

3. An apparatus according to claim 1 or 2 wherein said recording head comprises plural discharge openings and plural discharge energy generating elements respectively provided corresponding to said plural discharge openings.

4. An apparatus according to claim 3, wherein each said discharge energy generating element is structured to generate thermal energy, wherein said thermal energy induces a state change in the ink, and the ink is discharged by said state change from the discharge opening to form a flying droplet.

5. An apparatus according to claim 4, wherein said state change involves bubble formation by film boiling.

6. An image communicating apparatus provided with a recording head for forming images on pages of recording material by discharging ink from discharge openings, comprising:

plural ink jet cartridges each equipped with an ink jet head and a tank for supplying ink to said ink jet head collectively, at least one of which is switched for use in supplying ink to the discharge openings;

detection means for detecting an absence of ink in the tank of the at least one ink jet cartridge; and switching means for switching use of the at least one ink jet cartridge, according to a result of detection by said detection means, wherein when said detection means detects the absence of ink in the tank of the at least one ink jet cartridge during recording of a page, said switching means switches use of the at least one ink jet cartridge into that of another of said plural ink jet cartridges after the page has been recorded.

7. An apparatus according to claim 6, further comprising means for indicating the result of detection by said detection means.

8. An apparatus according to claim 6 or 7, wherein said recording head comprises plural discharge openings and plural discharge energy generating elements respectively provided corresponding to said plural discharge openings.

9. An apparatus according to claim 8, wherein each said discharge energy generating element is structured to generate thermal energy, wherein said thermal energy induces a state change in the ink, and the ink is discharged by said state change from the discharge opening to form a flying droplet.

10. An apparatus according to claim 9, wherein said state change involves bubble formation by film boiling.

* * * * *